United States Patent
Enoki et al.

(12)

(10) Patent No.: US 6,227,163 B1
(45) Date of Patent: May 8, 2001

(54) FUEL INJECTION CONTROL SYSTEM FOR CYLINDER INJECTION TYPE INTERNAL COMBUSTION ENGINE

(75) Inventors: Keiichi Enoki; Hirofumi Ohuchi; Ryoji Nishiyama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,967

(22) Filed: Jun. 28, 2000

(30) Foreign Application Priority Data

Dec. 28, 1999 (JP) ................................. 11-374263

(51) Int. Cl.$^7$ ................................................... F02B 17/00
(52) U.S. Cl. .......................................... 123/295; 123/305
(58) Field of Search ..................................... 123/295, 305

(56) References Cited

U.S. PATENT DOCUMENTS

| 6,085,717 | * | 7/2000 | Kamura | 123/295 |
| 6,116,210 | * | 9/2000 | Oder et al. | 123/305 |
| 6,148,791 | * | 11/2000 | Fujieda et al. | 123/295 |
| 6,170,459 | * | 1/2001 | Ono et al. | 123/305 |

FOREIGN PATENT DOCUMENTS 8-312396    11/1996 (JP) .

\* cited by examiner

*Primary Examiner*—John Kwon
(74) *Attorney, Agent, or Firm*—Sughrue, Mion, Zinn Macpeak & Seas, PLLC

(57) ABSTRACT

A fuel injection control system for a cylinder injection type internal combustion engine, which system suppresses occurrence of torque shock upon changeover of combustion modes while protecting combustion performance of the engine from degradation to thereby enhance drivability of a motor vehicle equipped therewith. The control system includes a means (21) for detecting cylinder-charged intake air quantity information (Qai), a means (22) for setting a combustion mode (M) of the engine, a means (24) for setting a desired air-fuel ratio (A/Fo), a means (25) for setting a desired intake air quantity (Qao) conforming to the combustion mode, a means (27) for setting a fuel injection quantity (Qf) for the fuel injector means (13) so that the desired air-fuel ratio (A/Fo) is realized, a means (26) for setting a throttle valve opening degree so that the desired intake air quantity can be realized, and a means (23) for changing over the combustion modes. The fuel injection quantity control means (27) is comprised of a combustion-mode-changeover-oriented fuel injection quantity control means (28) for altering the fuel injection quantity so that it changes in reverse phase relative to the change of the cylinder-charged intake air quantity upon changeover of the combustion modes.

6 Claims, 16 Drawing Sheets

FIG. 16
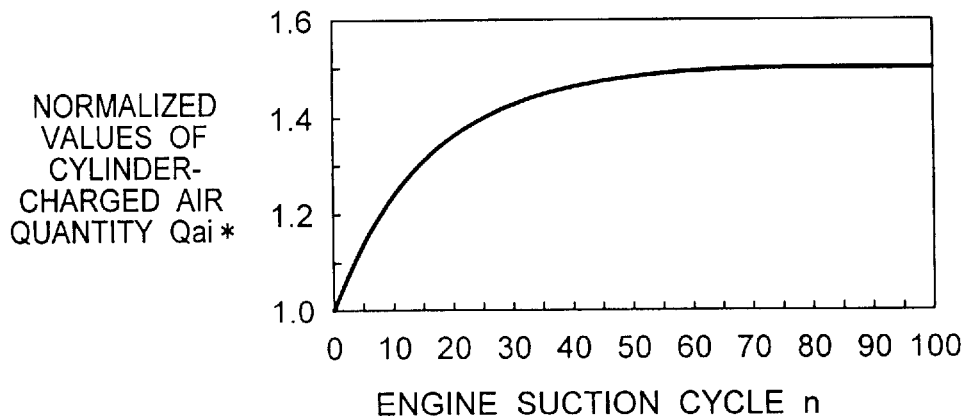
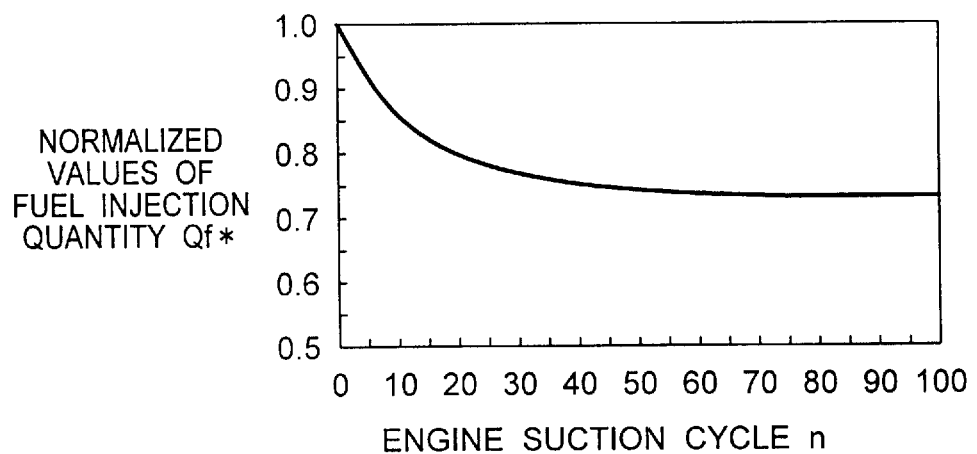
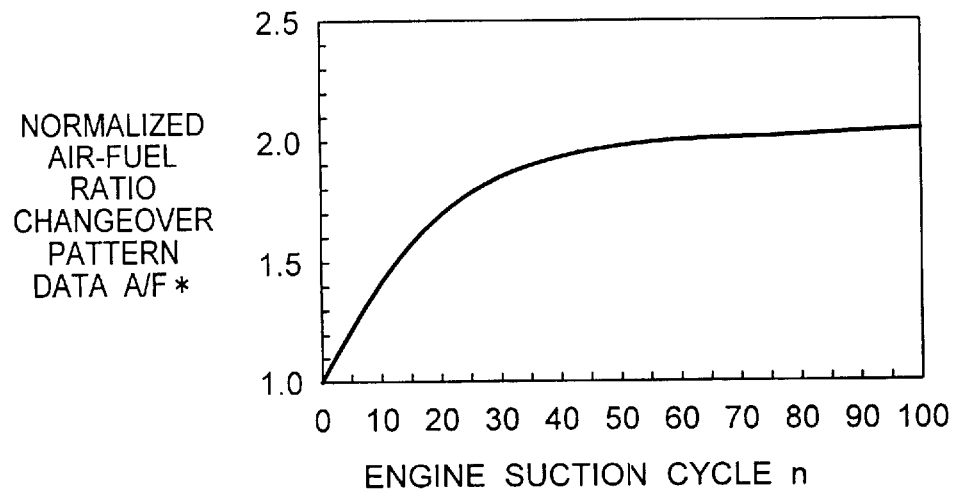

FUEL INJECTION CONTROL SYSTEM FOR CYLINDER INJECTION TYPE INTERNAL COMBUSTION ENGINE

BACKGROUND OF THE INVENTION

1. Field of the Invention

The present invention relates to a fuel injection control system for an internal combustion engine of cylinder injection type (also called direct injection type), which system is designed to inject directly a fuel into a plurality of cylinder chambers of the engine for allowing a fuel mixture to be burnt or combusted in a lean state in response to spark ignition. More particularly, the invention is concerned with a fuel injection control system for an engine of cylinder injection type which system is so arranged as to suppress occurrence of the so-called torque shock upon changeover of combustion modes while protecting combustion performance from degradation to thereby enhance drivability of a motor vehicle equipped with the engine.

2. Description of Related Art

Heretofore, there has been well known in the art such a cylinder injection type internal combustion engine in which the fuel injectors are disposed in the individual cylinders, respectively, for injecting directly the fuel into the combustion chambers as well as the fuel injection control system therefor. By way of example, reference is to be made to Japanese Patent Application Laid-Open No. 312396/1996 (JP-A-8-312396).

In the cylinder injection type internal combustion engine, torque generated by the engine will change in dependence on the air-fuel ratio even in the state where the throttle valve is held at a same opening degree. Accordingly, it is necessary to set optimally the combustion parameters such as the ignition timing and the fuel injection timing in dependence on the engine load and the air-fuel ratio by controlling properly the opening degree of the throttle valve and hence the air-fuel ratio.

For having better understanding of the principle underlying the present invention, technical background thereof will be described below in some detail. FIG. 12 is a schematic diagram showing generally an arrangement of a conventional fuel injection control system for a cylinder injection type internal combustion engine known heretofore.

Referring to FIG. 12, an internal combustion engine (hereinafter also referred to as the engine) 1 is equipped with an intake pipe 1a for introducing the intake air into the engine and an exhaust pipe 1b for discharging the exhaust gas resulting from the combustion of the air-fuel mixture.

An air flow sensor 2 for detecting a flow rate or quantity Qa of the intake air fed to the engine 1 as indicated by an arrow is installed at an upstream location in the intake pipe 1a.

Further installed within the intake pipe 1a is a throttle valve 3 for adjusting or regulating the intake air flow rate Qa, wherein a throttle position sensor 4 for detecting the opening degree θ of the throttle valve 3 is provided in association therewith.

Installed at a downstream location within the intake pipe 1a, e.g., at a location immediately preceding to the engine 1 is a surge tank 5.

On the other hand, an air-fuel ratio sensor 6 which may be constituted by a linear type $O_2$-sensor is provided in association with the exhaust pipe 1b for detecting an actual air-fuel ratio F of the exhaust gas, which ratio ordinarily lies within a range of e.g. 10 to 50.

A throttle valve actuator 7 is provided in association with the throttle valve 3 for adjusting the opening degree θ thereof. This actuator 7 may be constituted, for example, by a stepping or stepper motor which is designed for stepwise driving rotationally the throttle valve 3 to thereby adjust the rate or quantity of the intake air flowing through the intake pipe 1a.

Installed within each of the cylinders of the engine 1 is a spark plug 8 at which electric spark discharge is caused to take place for igniting the air-fuel mixture charged into the combustion chamber defined within the cylinder. To this end, a distributor 9 is provided for supplying a high voltage distributively to the individual spark plugs 8 in conformance with proper ignition timing.

Further installed is an ignition coil 10 which is realized in the form of a transformer having primary and secondary windings. A high voltage required for the spark ignition is induced in the secondary winding of the ignition coil 10 whenever a primary current flowing through the primary winding is interrupted. The high voltage is then supplied to the distributor 9. Provided in association with the ignition coil 10 is an ignitor 11 which is constituted by a power transistor for interrupting the current flowing through the primary winding of the ignition coil 10 in conformance with the ignition timing for the engine cylinders.

The spark plug 8, the distributor 9, the ignition coil 10 and the ignitor 11 cooperate to constitute a so-called ignition system for igniting or firing the air-fuel mixture within the individual cylinders of the engine 1.

Each of the engine cylinders is equipped with a fuel injector 13 for injecting directly the fuel into the cylinder chamber. A crank angle sensor 14 for generating a crank angle signal CA is provided in association with the crank shaft which is driven rotationally by the engine 1.

The crank angle sensor 14 is designed to output a pulse signal corresponding to the engine rotation number or engine speed (rpm) as the crank angle signal CA and serves also as an engine rotation sensor (or engine speed sensor), as is well known in the art. Further, the crank angle signal CA contains pulses having edges which represent the reference crank angles for the individual cylinders, respectively, wherein the reference crank angles are used for arithmetically determining various control timings for operation of the engine 1.

An accelerator pedal (not shown) manipulated by an operator or driver is provided with an accelerator pedal position sensor 15 for detecting the accelerator pedal stroke α.

An exhaust gas recirculation passage (hereinafter also referred to as the EGR passage) 16 is provided between the exhaust pipe 1b and the surge tank 5 for the purpose of recirculating a part of the exhaust gas into the intake pipe 1a, wherein a stepping-motor-driven type EGR regulating valve 17 (constituting a part of the EGR regulating means) is provided in association with the EGR passage 16 for regulating the amount or quantity of the exhaust gas recirculated to the intake pipe. This quantity is referred to as the EGR quantity.

An ECU (Electronic Control Unit) 12 which is in charge of controlling the engine system as a whole is comprised of a microcomputer for arithmetically determining control quantities or parameters for various actuators which are installed for controlling the fuel combustion in the engine 1 on the basis of information detected by various types of sensors (i.e., information concerning the operation states of the engine 1), to thereby issue driving signals indicative of control quantities to the relevant actuators.

As the control signals, there may be mentioned an intake-air quantity control signal A for the throttle actuator 7, an ignition timing signal G for the ignitor 11 (and hence for the ignition system), an injection pulse signal J for each of the fuel injector 13, an EGR control signal E for the EGR regulating valve 17 and others.

As other sensors not shown in the drawings, there may be mentioned an intake air pressure sensor disposed within the intake manifold of the engine for detecting the intake air pressure of the engine 1 (also referred to as the boost pressure Pb which represents the intra-cylinder intake air quantity), a water temperature sensor for detecting the temperature of cooling water for the engine 1 and the like.

In general, the engine 1 has different types of combustion modes which include a homogeneous combustion mode in which the fuel injection is carried out during the suction stroke and a stratified combustion mode in which the fuel injection is carried out during the compression stroke.

FIG. 13 is a view for illustrating the combustion modes (or fuel injection modes) which are set in dependence on the engine operation states represented, for example, by the engine speed Ne and the engine load.

Referring to FIG. 13, the combustion modes are changed over sequentially as the engine speed Ne and the engine load (represented by the accelerator pedal stroke α or the intake air quantity information Qa or the like) increase. More specifically, starting from a so-called compression lean mode (i.e., combustion mode in which fuel is injected during the compression stroke in such an amount that a lean air-fuel mixture prevails within the cylinder), the combustion mode can be changed over to a suction lean mode (i.e., combustion mode in which the fuel is injected during the suction stroke in such an amount that a lean air-fuel mixture prevails within the cylinder) and hence to a stoichiometric ratio feedback mode (i.e., combustion mode in which the fuel is injected during the suction stroke in such an amount that the air-fuel mixture of the stoichiometric air-fuel ratio prevails within the cylinder) and hence to an open loop mode (i.e., combustion mode in which the fuel injection quantity is increased without validating the feedback control).

In the compression lean mode, combustion is realized with extremely lean fuel mixture because of the fuel injection carried out during the compression stroke.

Further, in the suction lean mode, combustion is realized with a lean fuel mixture (with a greater air-fuel ratio when compared with the stoichiometric ratio) due to the fuel injection during the suction stroke even though the fuel mixture is not so lean as in the compression lean mode.

Furthermore, in the stoichiometric ratio feedback mode, combustion is effected with the stoichiometric air-fuel ratio on the basis of the oxygen concentration signal derived from the output of the air-fuel ratio sensor.

Finally, in the open loop mode, combustion is effected in the fuel-rich state without validating the feedback control.

With the fuel injection control system for the cylinder injection type internal combustion engine described above, not only the engine output performance but also the fuel consumption can be improved by changing over the target or desired air-fuel ratio between the stoichiometric air-fuel ratio on the order of 14.7 and the large air-fuel ratio on the order of 20 to 30 (lean mixture) in dependence on the combustion modes.

When the desired air-fuel ratio is to be changed in dependence on the combustion modes (i.e., upon changeover of the combustion modes), the fuel injection quantity which can be represented by a combination of the air-fuel ratio A/F and the cylinder-charged intake air quantity Qai is so adjusted that the available engine output torque can remain unchanged for the accelerator pedal stroke α which reflects the driver's intention in order to suppress the torque shock.

FIG. 14 is a view for illustrating the output torque characteristics (obtained experimentally) of the engine 1. More specifically, shown at (a) in FIG. 14 is the engine output torque characteristics observed when the boost pressure Pb equivalent to the cylinder-charged intake air quantity Qai is changed with the fuel injection quantity Qf being maintained constant while illustrated at (b) in FIG. 14 is the engine output torque characteristic observed when the fuel injection quantity Qf is changed with the boost pressure Pb, i.e., the cylinder-charged intake air quantity, being maintained constant.

In the case illustrated at (a) in FIG. 14, the pumping loss decreases in proportion to the increase of the cylinder-charged intake air quantity Qai. Thus, the output torque of the engine 1 bears a proportional relation to the cylinder-charged intake air quantity Qai.

On the other hand, in the case illustrated at (b) in FIG. 14, the output torque of the engine 1 bears a proportional relation to the fuel injection quantity Qf.

Parenthetically, in FIGS. 14(a) and (b), the point a represents the torque value in the stoichiometric mode while the point b represents the torque value in the compression lean mode (with a large air-fuel ratio (lean mixture)). By way of example, in a steady running state succeeding to the acceleration, the stoichiometric air-fuel ratio (based on the point a) is changed over to a large or lean air-fuel ratio (based on the point b).

When the combustion mode is changed over from the stoichiometric mode to the compression lean mode with the throttle valve opening degree a being increased to thereby allow the boost pressure Pb (or cylinder-charged intake air quantity Qai) to increase from a level corresponding to the stoichiometric air-fuel ratio value Pba to a level corresponding to the lean air-fuel ratio value Pbb, the output torque will increase by a quantity ΔTp due to decrease of the pumping loss (see FIG. 14 at (a)).

Consequently, even when the fuel injection quantity Qf is held constant after the changeover of the combustion mode, there takes place a torque difference corresponding to the above-mentioned torque change ΔTp even in the state where the accelerator pedal stroke is held constant by the driver.

Such being the circumstances, it becomes necessary to generate a change quantity ΔTf (see FIG. 14 at (b)) by adjusting the fuel injection quantity Qf so as to cancel out the torque difference, i.e., the torque change quantity ΔTp mentioned above.

By way of example, in the conventional system described in Japanese Patent Application Laid-Open No. 312396/1996 (JP-A-8-312396) mentioned hereinbefore, the air-fuel ratio to be controlled is changed by varying linearly the reciprocal F/Ao of the desired air-fuel ratio A/Fo upon changeover of the combustion modes.

More specifically, for changing over the combustion mode to the lean side, the reciprocal F/Ao of the desired air-fuel ratio is changed linearly in the leaning direction (i.e., decreasing direction).

FIG. 15 is a timing chart for illustrating the combustion mode changeover operations of the conventional system disclosed in the publication mentioned above. In the figure, the time base for the control cycles of the engine 1 is taken along the abscissa.

More specifically, shown in FIG. 15 is a steady running state of the engine in which the combustion mode flag is changed over to the compression lean mode (i.e., the stratified combustion mode) from the stoichiometric mode (i.e., combustion mode with the stoichiometric air-fuel ratio).

As can be seen from FIG. 15, when the desired throttle valve opening degree θo is changed so as to increase upon changeover of the combustion modes, then the actual throttle valve opening degree θ is also changed stepwise instantaneously in the increasing direction in response to the changeover of the desired throttle valve opening degree θo.

On the other hand, the boost pressure Pb (cylinder-charged intake air quantity Qai) increases along a curve representing a delay from the changeover time point, as can be seen in FIG. 15. This is because the intake air fed through the intake pipe can reach the engine 1 with a delay after having been stored in the surge tank 5 and the intake manifold, respectively. This delay is referred to as the first-order delay for convenience of the description.

Thus, it is apparent that the cylinder-charged intake air quantity Qai which increases with the first-order delay, as described above, does not coincide with the reciprocal F/Ao of the desired air-fuel ratio which changes linearly. Consequently, the fuel injection quantity Qf which is so controlled as to decrease as a function of the reciprocal F/Ao of the desired air-fuel ratio will undergo inevitably such a variation as illustrated in FIG. 15 under the influence of the first-order delay of the change of the cylinder-charged intake air quantity Qai. As a result of this, in the transient state intervening the combustion modes changed over, the torque change quantity ΔTp ascribable to the increase of the boost pressure Pb (cylinder-charged intake air quantity Qai) can not be canceled out by the torque change quantity ΔTf brought about by the control of decreasing the fuel injection quantity Qf, which results in variation of the overall torque change quantity ΔTr (=Tp+ΔTf).

Parenthetically, FIG. 15 shows the behaviors of the engine in the course of mode changeover from the stoichiometric mode to the compression lean mode. It should however be understood that similar torque shock may take place in the mode changeover from the compression lean mode to the stoichiometric mode.

As is apparent from the foregoing, the conventional fuel injection control system for the cylinder injection type internal combustion engine suffers a problem that the torque change ΔTf brought about by the change of the fuel injection quantity Qf can not cancel out the torque change ΔTp ascribable to the change of the boost pressure Pb (cylinder-charged intake air quantity Qai) because in the transient state which accompanies the changeover of the combustion mode, the desired air-fuel ratio is changed linearly for the boost pressure Pb (cylinder-charged intake air quantity Qai) which changes with the first-order delay. Thus, occurrence of the torque shock can not be suppressed, giving rise to a problem.

SUMMARY OF THE INVENTION

In the light of the state of the art described above, it is an object of the present invention to solve the problems mentioned above and provide a fuel injection control system for the cylinder injection type internal combustion engine, which system is capable of suppressing occurrence of the so-called torque shock while protecting combustion performance of the engine from degradation and enhancing the drivability thereof by altering or modifying the change of fuel injection quantity in reverse phase relative to the change of the boost pressure (indicating the cylinder-charged intake air quantity) upon changeover of the combustion modes.

In view of the above and other objects which will become apparent as the description proceeds, there is provided according to an aspect of the present invention a fuel injection control system for a cylinder injection type internal combustion engine, which system includes various types of sensors for detecting operation states of an internal combustion engine, a fuel injector for injecting fuel directly into a cylinder of the engine, a cylinder-charged intake air quantity detecting means for detecting cylinder-charged intake air quantity information corresponding to an intake air quantity charged in the cylinder of the engine on the basis of intake air quantity information derived from outputs of the sensors, a combustion mode control means for setting one of combustion modes of the engine in dependence on the operation states thereof, a desired air-fuel ratio control means for setting one of desired air-fuel ratios which differ in dependence on the combustion modes, a desired intake-air quantity control means for setting one of desired intake air quantities which differ in dependence on the combustion modes, a fuel injection quantity control means for setting a fuel injection quantity for the fuel injector means so that the desired air-fuel ratio is realized, a throttle valve control means for setting a throttle valve opening degree of the engine so that the desired intake air quantity is realized, and a combustion mode changeover means for changing over the combustion modes in dependence on the operation states, wherein the fuel injection quantity control means is comprised of a combustion-mode-changeover-oriented fuel injection quantity control means for modifying the fuel injection quantity so that change thereof assumes reverse phase relative to a change of the cylinder-charged intake air quantity information upon changeover of the combustion modes.

In a preferred mode for carrying out the present invention, the combustion-mode-changeover-oriented fuel injection quantity control means may be so arranged as to include an air-fuel ratio changeover pattern storage means for storing previously a changeover pattern of the desired air-fuel ratio as an air-fuel ratio changeover pattern so that the fuel injection quantity changes in reverse phase relative to the change of the cylinder-charged intake air quantity information. In that case, the desired air-fuel ratio oriented to changeover of the combustion modes can be altered on the basis of the desired air-fuel ratio validated at a time point around the changeover of the combustion modes and the air-fuel ratio changeover pattern, and the fuel injection quantity can be altered or updated at the time point of changeover of the combustion modes on the basis of the altered desired air-fuel ratio and the cylinder-charged intake air quantity information.

In another preferred mode for carrying out the present invention, the combustion-mode-changeover-oriented fuel injection quantity control means may be so arranged as to include a combustion-mode-changeover-oriented air-fuel ratio altering means for setting a combustion-mode-changeover-oriented air-fuel ratio by changing with a first-order delay the desired air-fuel ratio for suction cycle of the engine at a time point around the changeover of the combustion modes. In that case, the fuel injection quantity oriented to the changeover of combustion modes can be altered on the basis of the cylinder-charged intake air quantity information and the combustion-mode-changeover-oriented air-fuel ratio mentioned above.

In yet another preferred mode for carrying out the present invention, the various type sensor means may be comprised of an intake air quantity detecting means for detecting as intake air quantity information an intake air quantity at an upstream location within an intake pipe of the engine. In that case, the combustion-mode-changeover-oriented fuel injection quantity control means may be so arranged as to include a desired fuel injection quantity arithmetic means for determining arithmetically a desired fuel injection quantity on the basis of the intake air quantity information and the desired air-fuel ratio, and the desired fuel injection quantity can be changed with a first-order delay for a suction cycle of the engine.

In still another preferred mode for carrying out the present invention, the combustion-mode-changeover-oriented fuel injection quantity control means may be so designed as to increase supplementarily the fuel injection quantity around a time point of changeover of the combustion modes in a region which covers a predetermined air-fuel ratio and in which combustion performance of the engine becomes degraded.

In a further preferred mode for carrying out the present invention, on the presumption that the combustion modes are comprised of a homogeneous combustion mode in which the fuel injection is carried out during a suction stroke of the engine and a stratified combustion mode in which the fuel injection is carried out during a compression stroke of the engine, the combustion-mode-changeover-oriented fuel injection quantity control means may be so designed as to perform supplementary fuel injection during a compression stroke of the engine around a time point of combustion mode changeover from the stratified combustion mode to the homogeneous combustion mode when the combustion performance of the engine becomes degraded.

With the arrangements of the fuel injection control systems for the cylinder injection type internal combustion engine, occurrence of the torque shock can be suppressed satisfactorily with drivability being enhanced significantly, to great advantages.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 16 is a view for illustrating pattern data for changing over air-fuel ratios in the system according to the first embodiment of the invention.

DESCRIPTION OF THE PREFERRED EMBODIMENTS

Figure 1:
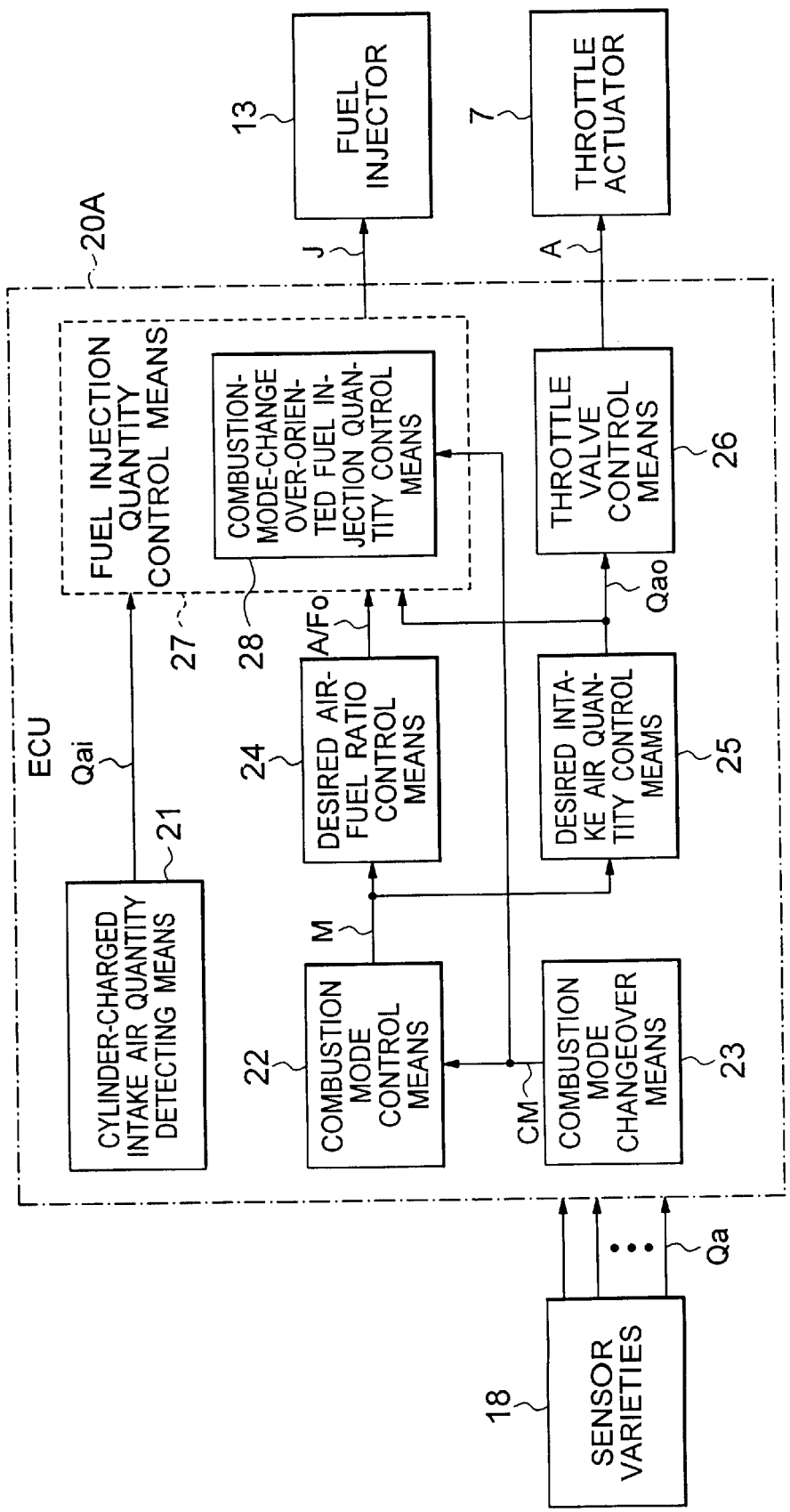
FIG. 1 is a functional block diagram showing generally an arrangement of a fuel injection control system for a cylinder injection type internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, description will be made of the fuel injection control system for a cylinder injection (direct injection) type internal combustion engine according to a first embodiment of the present invention by reference to FIG. 1.

FIG. 1 is a functional block diagram showing generally an arrangement of major components of the fuel injection control system for the cylinder injection type engine according to the first embodiment of the invention. In the figure, components same as or equivalent to those of the conventional system described hereinbefore by reference to FIG. 12 are denoted by like reference symbols, and repeated description thereof will be omitted.

Figure 12:
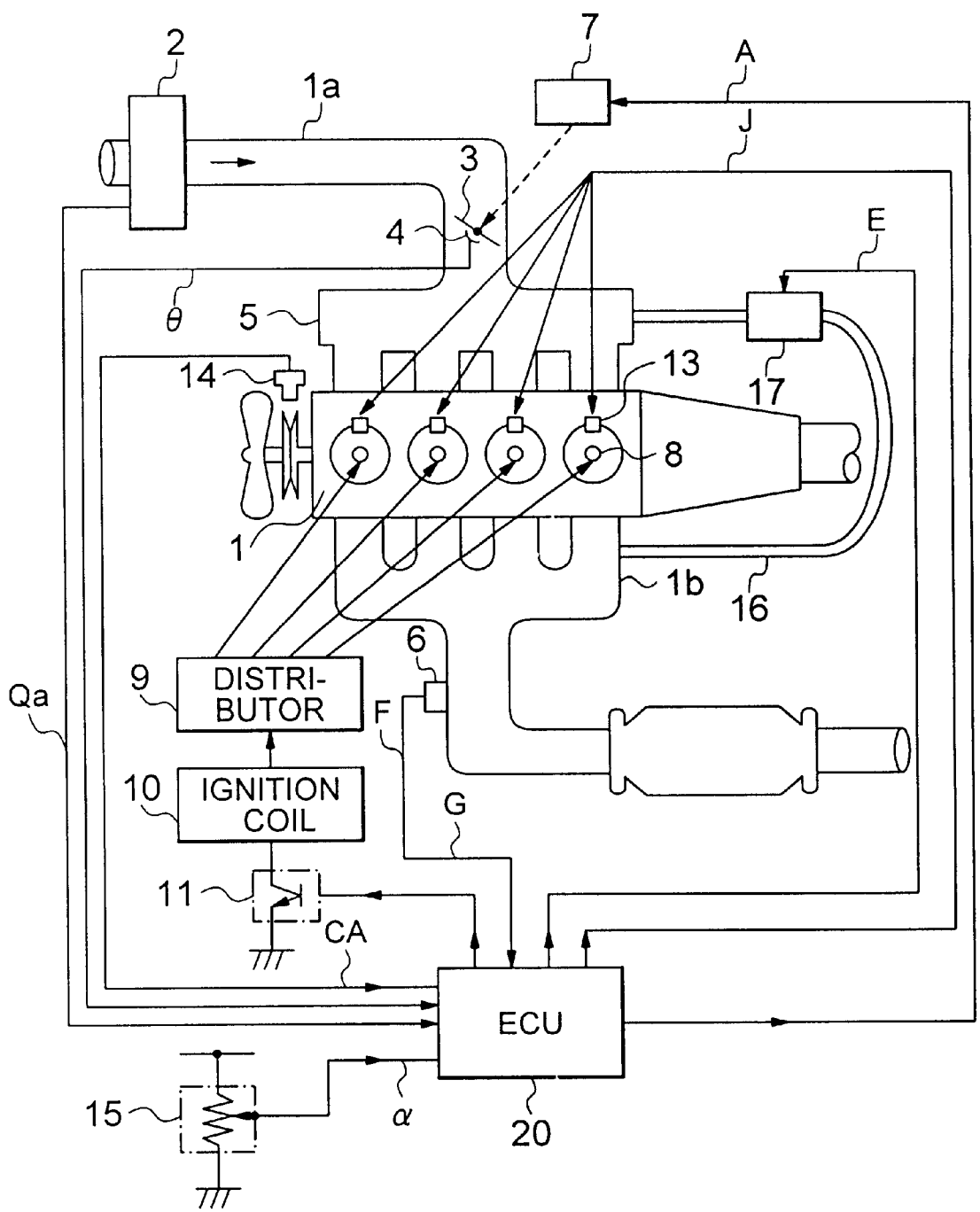
FIG. 12 is a schematic diagram showing generally an arrangement of a conventional fuel injection control system for a cylinder injection type internal combustion engine known heretofore.
Figure 13:
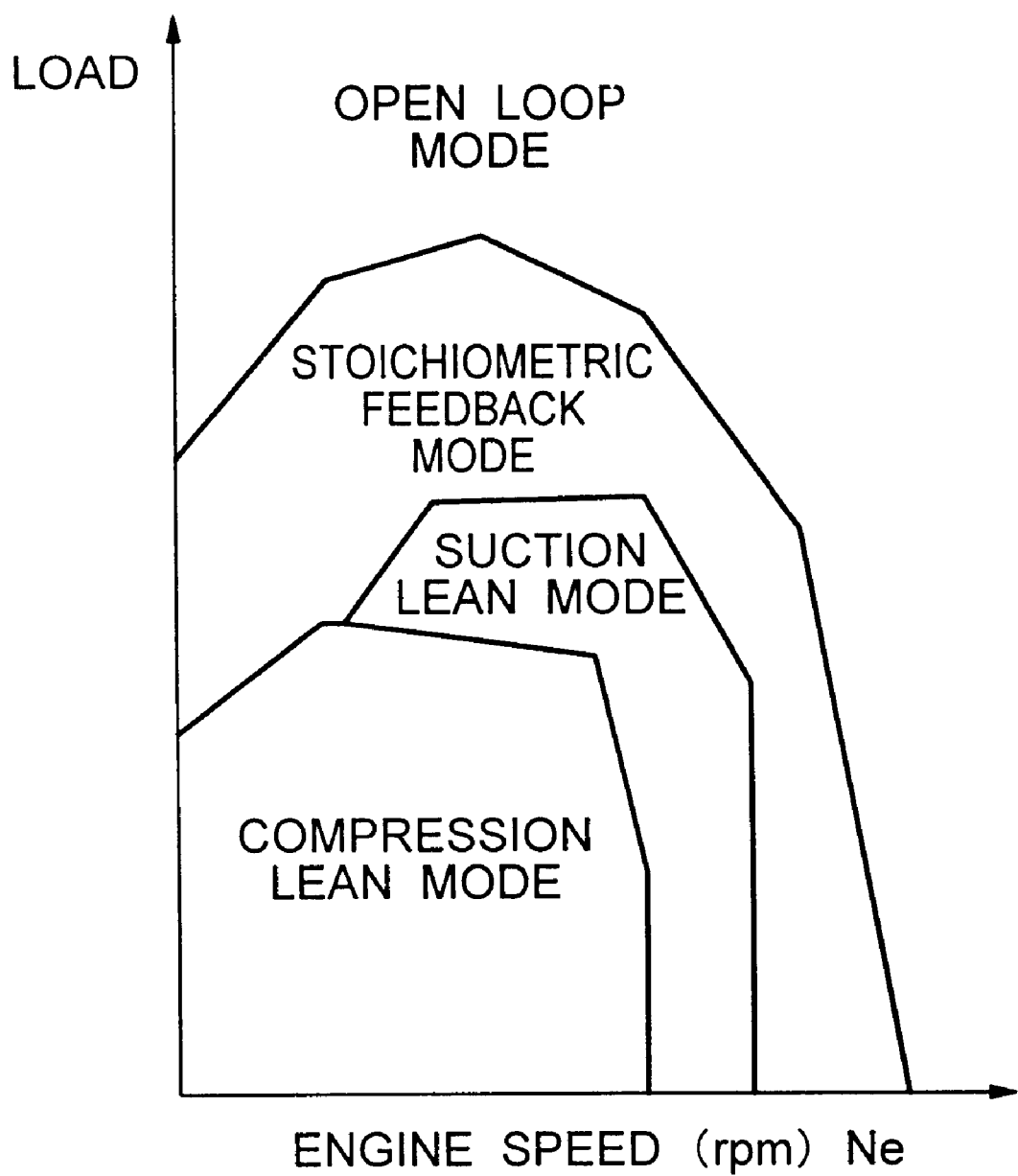
FIG. 13 is a view for illustrating combustion modes of the cylinder injection type internal combustion engine.
Figure 14:
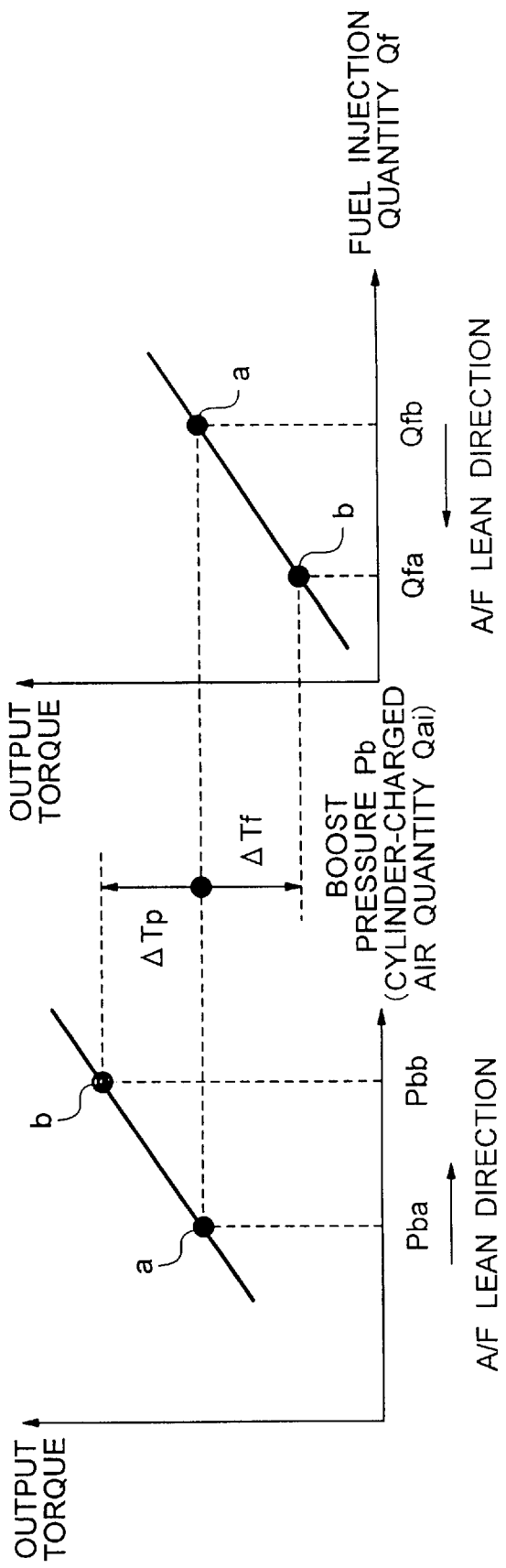
FIG. 14 is a view for generally illustrating output torque characteristics of the cylinder injection type internal combustion engine.

Parenthetically, the structure of the fuel injection control system inclusive of the engine on the whole is essentially same as that shown in FIG. 12. Further, in the description which follows, it is presumed that the combustion modes (fuel injection modes) are changed over in a similar manner as described previously by reference to FIG. 13.

Referring to FIG. 1, the various types of sensors denoted generally by reference numeral 18 include an intake air quantity detecting means such as the air flow sensor 2, intake air pressure sensor or the like for generating the intake air quantity information Qa which represents the quantity of air fed to the engine 1 (see FIG. 12).

The cylinder-charged intake air quantity information (i.e., information representing the quantity of the intake-air charged into the cylinder) Qai may be arithmetically determined on the basis of the intake air quantity information Qa (intake air quantity or flow rate measured at an upstream location within the intake pipe) derived from the output of the air flow sensor 2 by means of a CPU (Central Processing Unit) constituting a major part of the electronic control unit (ECU) 20A. Alternatively, the cylinder-charged intake air quantity information Qai may be represented by the boost pressure Pb which can be derived on the basis of the outputs of the sensor varieties 18.

The ECU 20A is comprised of a cylinder-charged intake air quantity detecting means 21, a combustion mode control means 22, a combustion mode changeover means 23, a desired (target) air-fuel ratio control means 24, a desired (target) intake-air quantity control means 25, a throttle valve control means 26 and a fuel injection quantity control means 27.

The fuel injection quantity control means 27 includes a combustion-mode-changeover-oriented fuel injection quantity control means 28.

The ECU 20A of the system now under consideration differs from the ECU 20 (FIG. 12) of the conventional system only in that the combustion-mode-changeover-oriented fuel injection quantity control means 28 is provided.

The ECU 20A is designed to control various types of actuators such as the throttle actuator 7, the fuel injector 13 and others by outputting an intake-air quantity control signal A, an injection pulse signal J and others in dependence on the engine operation states.

The cylinder-charged intake air quantity detecting means 21 incorporated in the ECU 20A is designed to detect the cylinder-charged intake air quantity information Qai which represents the quantity of the intake air actually charged in the cylinder of the engine 1.

The combustion mode control means 22 serves for setting the combustion mode M of the engine 1 (see FIG. 13), while the combustion mode changeover means 23 is designed to output a mode changeover signal CM for changing over the combustion modes M in dependence on the engine operation states.

The desired air-fuel ratio control means 24 is designed to set the desired air-fuel ratio A/Fo for each of the combustion modes M, which ratio changes in dependence on the engine speed Ne (rpm) and the engine load. Similarly, the desired intake-air quantity control means 25 is designed to set the desired intake air quantity Qao for each of the combustion modes M, which ratio also differs in dependence on the engine speed Ne (rpm) and the engine load.

The throttle valve control means 26 is designed to drive the throttle actuator 7 in response to the intake-air quantity control signal A so that opening degree θ of the throttle valve of the engine 1 is set to the position at which the desired intake air quantity Qao can be realized.

The fuel injection quantity control means 27 is designed to drive the fuel injector 13 in response to the injection pulse signal J for thereby setting the fuel injection quantity Qf so that the air-fuel ratio detected actually on the basis of the output of the air-fuel ratio sensor coincides with the desired or target air-fuel ratio A/Fo.

The combustion-mode-changeover-oriented fuel injection quantity control means 28 also incorporated in the fuel injection quantity control means 27 of the ECU responds to the mode changeover signal CM issued upon changeover of the combustion modes M to thereby alter or modify the fuel injection quantity Qf so that the latter changes in the reverse phase (or reciprocally) relative to the change of the cylinder-charged intake air quantity information Qai.

In this conjunction, the combustion-mode-changeover-oriented fuel injection quantity control means 28 may include an air-fuel ratio changeover pattern storage means (not shown) for storing previously a pattern for changing over the desired air-fuel ratio A/Fo as the air-fuel ratio changeover pattern in order to enable the fuel injection quantity Qf to change in reverse phase relative to the change of the cylinder-charged intake air quantity Qai.

More specifically, for changing over the combustion modes M, the combustion-mode-changeover-oriented fuel injection quantity control means 28 alters or modifies the desired air-fuel ratio on the basis of the desired air-fuel ratio validated at the time point of or around the changeover of the combustion modes M and the relevant air-fuel ratio changeover pattern mentioned above, to thereby alter the fuel injection quantity at the time point of changeover of the combustion modes M on the basis of the desired air-fuel ratio A/Fo as altered and the cylinder-charged intake air quantity information. At this juncture, it should be mentioned that the means 21, 22, 23, 24, 25, 26, 27 and 28 mentioned above may be implemented in the form of program modules which can be executed with a computer.

Figure 2:
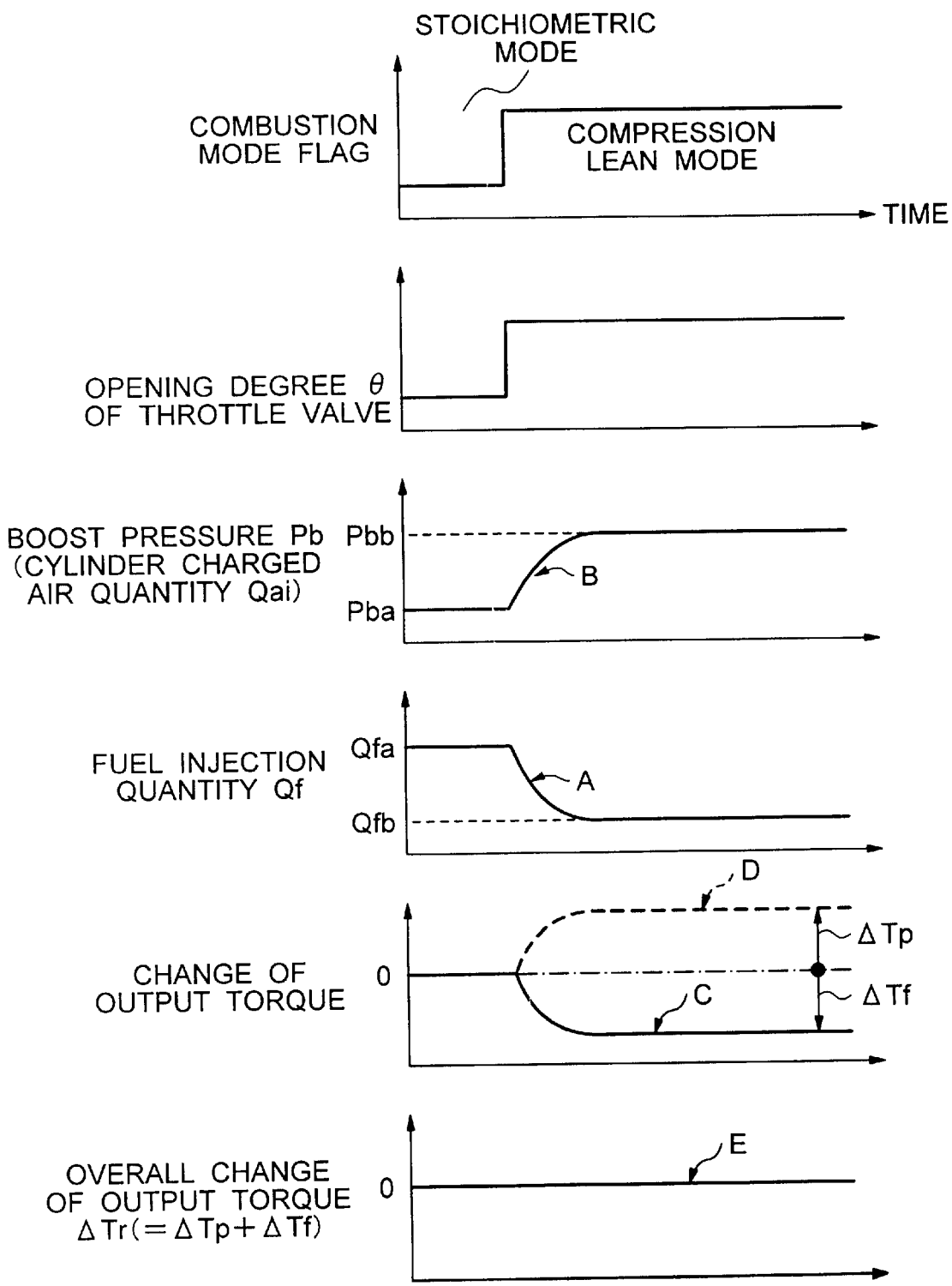
FIG. 2 is a waveform/timing diagram for illustrating fuel injection control operation of the fuel injection control system according to the first embodiment of the invention.
Figure 15:
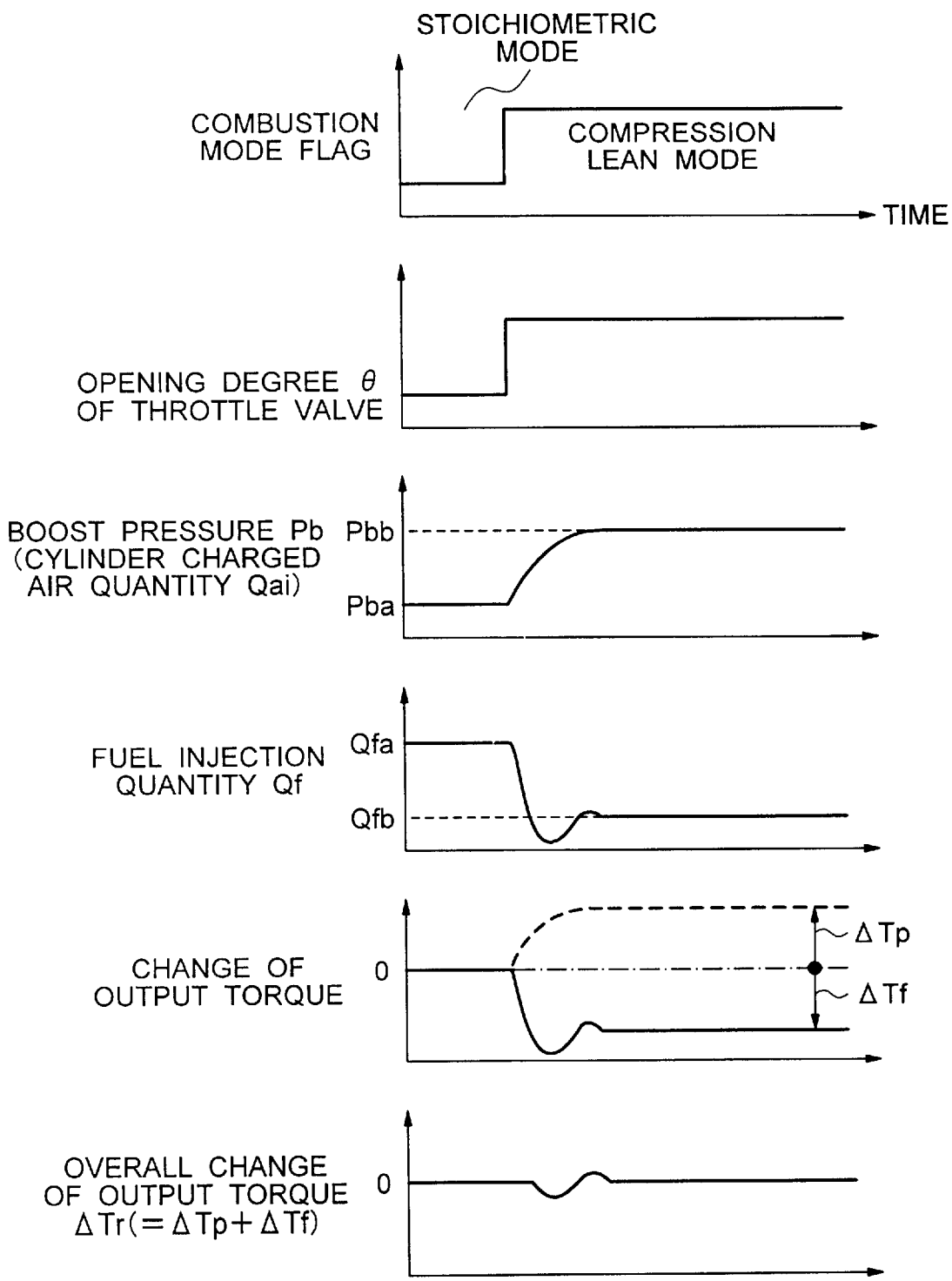
FIG. 15 is a waveform/timing diagram for illustrating combustion mode changeover operations of the conventional fuel injection control system.

FIG. 2 is a timing chart for illustrating the fuel injection control operation of the fuel injection control system according to the first embodiment of the present invention. This figure corresponds to FIG. 15 mentioned hereinbefore in conjunction with the description of the conventional system. As can be seen from FIG. 2, the fuel injection quantity Qf is caused to change in reverse phase or reciprocally relative to the change of the boost pressure Pb (equivalent to the change of the cylinder-charged intake air quantity information Qai) in the transient state taking place during the combustion mode changeover operation. Refer to curves A and B shown in FIG. 2.

Thus, the torque change ΔTf (see a curve C in FIG. 2) brought about by the change of the fuel injection quantity Qf can cancel out the torque change ΔTp (see a curve D) brought about by the change of the boost pressure Pb with the first-order delay, as a result of which the overall torque change ΔTr (torque shock) can be made substantially zero (see a curve E). In other words, the output torque of the engine 1 undergoes substantially no abrupt change.

Figure 3:
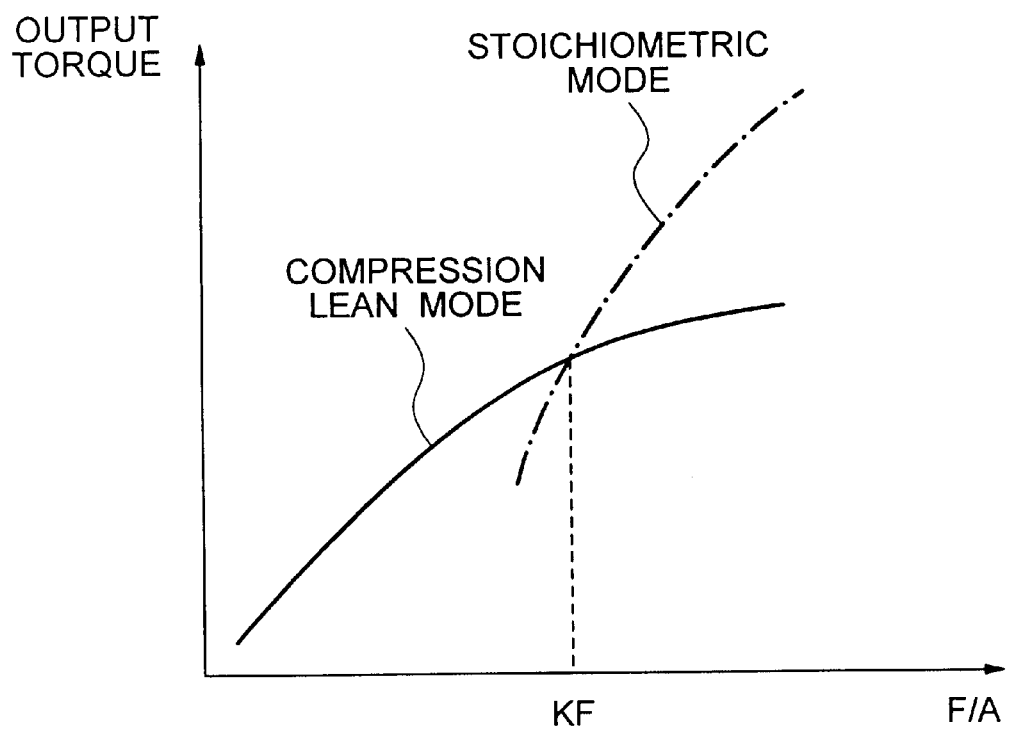
FIG. 3 is a view for illustrating a combustion mode changeover timing between a compression lean mode and a stoichiometric mode in the engine system according to the present invention.
Figure 4:
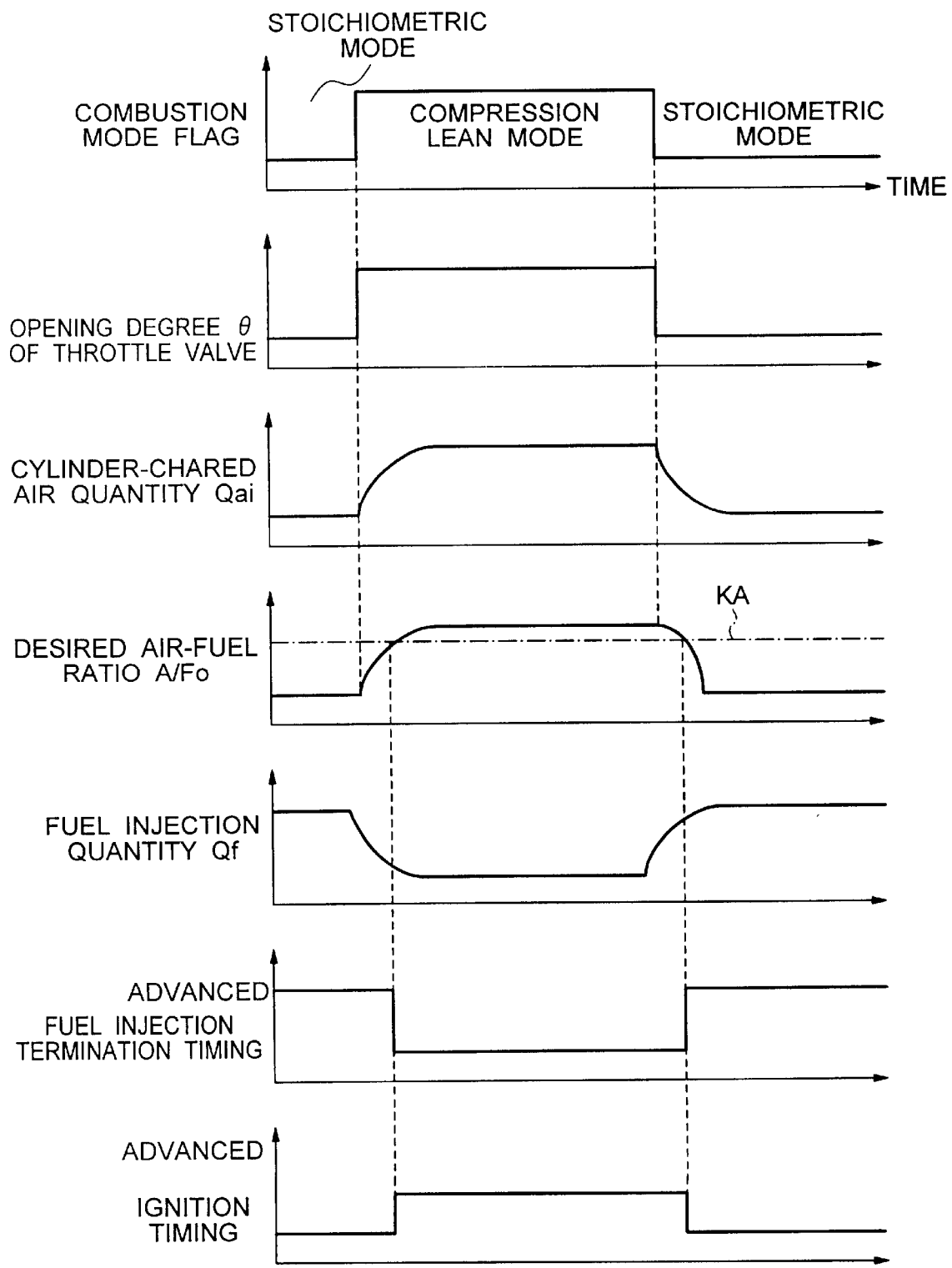
FIG. 4 is a waveform/timing diagram for illustrating a fuel injection quantity altering or modifying operation carried out by the fuel injection control system according to the first embodiment of the invention.
Figure 5:
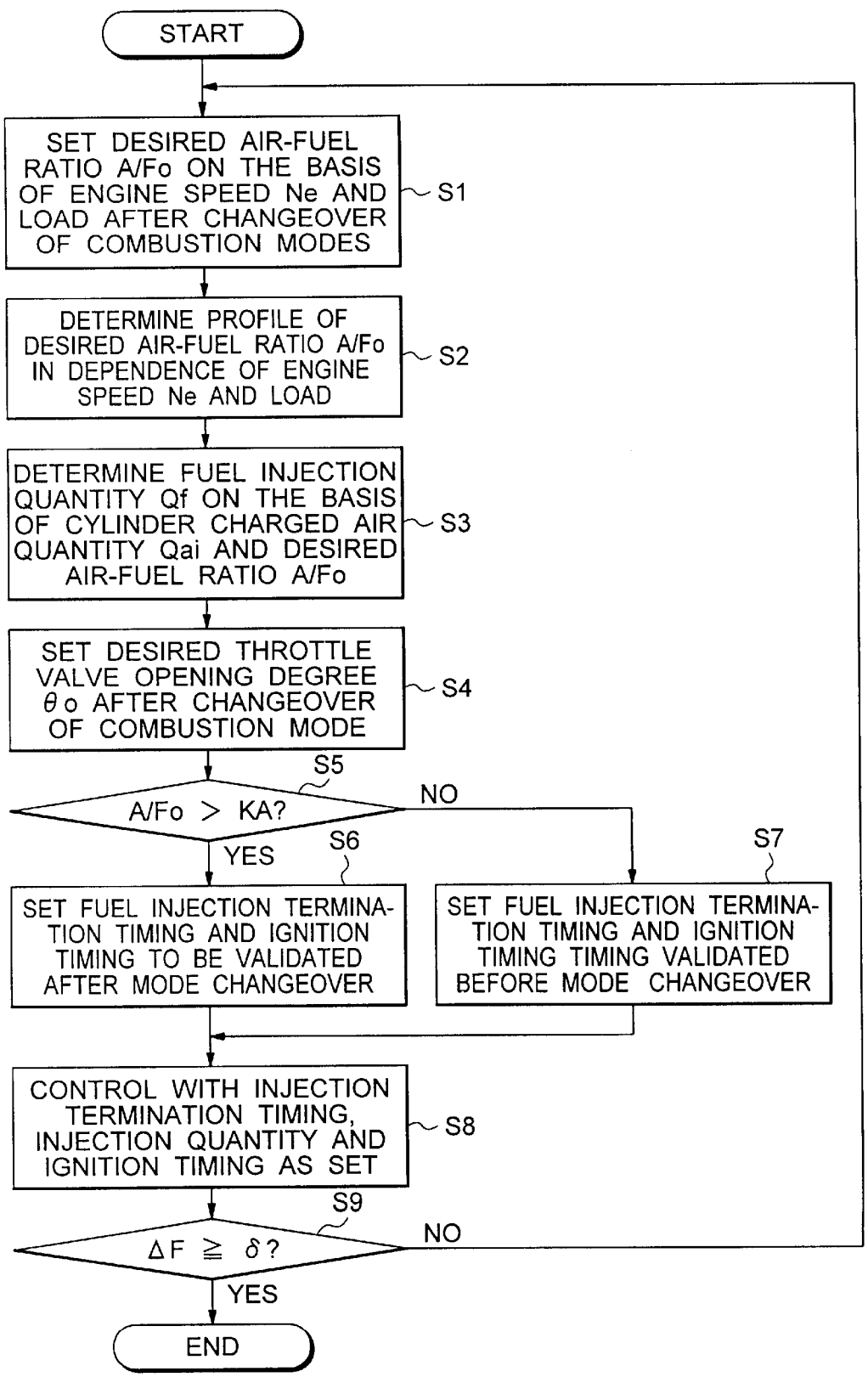
FIG. 5 is a flow chart for illustrating a fuel injection quantity altering or modifying operation of the control system according to the first embodiment of the invention.

Next, description will be directed to the control operation performed by the fuel injection control system according to the instant embodiment of the invention shown in FIG. 1 upon changeover of the combustion modes by reference to a waveform diagram shown in FIG. 4, a torque characteristic diagram shown in FIG. 3 and a flow chart shown in FIG. 5 together with FIG. 12.

In FIG. 3 which shows the changeover timing between the compression lean mode and the stoichiometric mode, the reciprocal F/A of the air-fuel ratio is taken along the abscissa while taken along the ordinate is the output torque of the engine 1.

At this juncture, it should be mentioned that the processings illustrated in FIGS. 4 and 5 are executed at every suction stroke cycle of the engine 1. By way of example, in the case of the four-cylinder engine, the processing routine (FIG. 5) is executed at every half of a complete engine rotation in the case of the four-cylinder engine, while it is executed at every one third of the complete rotation in the case of the six-cylinder engine.

As can be seen in FIG. 3, the output torque of the engine 1 increases generally as a function of the reciprocal F/A of the air-fuel ratio. However, the range of the reciprocal F/A in which the engine 1 can be driven differs between the compression lean mode (see a solid line curve) and the stoichiometric mode with the fuel injection effected in the suction stroke (see a single-dot line curve).

More specifically, in the compression lean mode, the change rate of the engine output torque starts to decrease in a region of the reciprocal values F/A beyond a predetermined value KF, while in the stoichiometric mode, the change rate of output torque starts to decrease in a region of the reciprocal value F/A smaller than the predetermined value KF.

Accordingly, by changing over the combustion mode at the timing point when the reciprocal F/A of the air-fuel ratio has reached the predetermined value KF (i.e., when the air-fuel ratio has reached a predetermined air-fuel ratio KA), only the region in which the output torque exhibits linear characteristic can be put into effect, whereby the torque shock which would otherwise take place upon mode changeover between the compression lean mode and the stoichiometric mode can be suppressed satisfactorily.

Referring to FIG. 4, when a combustion mode flag indicative of the combustion mode validated is changed over from the state designating the stoichiometric mode to the state designating the compression lean mode, the combustion mode changeover means 23 incorporated in the ECU 20A responds thereto by generating a mode changeover signal CM.

In response to the mode changeover signal CM, the throttle valve control means 26 generates an intake-air quantity control signal A corresponding to the changeover of the combustion mode flag. In response to this signal A, the throttle actuator 7 opens stepwise the throttle valve 3, whereby the throttle valve opening degree θ is caused to increase instantaneously.

At this time point, however, the intake air quantity Qai indicating the amount of air actually charged into the engine (i.e., the cylinder-charged intake air quantity) increases only with a delay due to the presence of the surge tank and the like within the intake pipe 1a, as described hereinbefore. This delay is what is referred to as the first-order delay.

On the other hand, the desired air-fuel ratio control means 24 sets the desired air-fuel ratio A/Fo in dependence on the engine speed Ne (rpm) and the engine load in a step S1 shown in FIG. 5.

Further, the air-fuel ratio changeover pattern storage means incorporated in the combustion-mode-changeover-oriented fuel injection quantity control means 28 sets a profile of the desired air-fuel ratio A/Fo (air-fuel ratio changeover pattern) for causing the fuel injection quantity Qf to change with the first-order delay in reverse phase relative to the change of the cylinder-charged intake air quantity Qai in dependence on the engine speed Ne (rpm) and the engine load (step S2).

Parenthetically, the air-fuel ratio changeover pattern may be prepared in advance and stored in a RAM (Random Access Memory) incorporated in the ECU 20A.

In this conjunction, normalized value Qai* of the cylinder-charged intake air quantity may previously be determined as the normalized air-fuel ratio changeover pattern data A/F* in accordance with the undermentioned expression (1) on the basis of the normalized value Qai* of the cylinder-charged intake air quantity and the normalized value Qf* of the fuel injection quantity which bears the reverse phase relation to the normalized value Qai* of the cylinder-charged intake air quantity, as can be seen from FIG. 16.

$$A/F^*(n)=Qai^*(n)/Qf^*(n) \tag{1}$$

where n represents the suction cycle of the engine 1.

Profile or pattern of the desired air-fuel ratio A/Fo can be arithmetically determined on the basis of the normalized air-fuel ratio changeover pattern data A/F* mentioned above, as follows:

$$A/Fo(n)=A/F(0) \times A/F^*(n) \tag{2}$$

where A/Fo(n) represents the desired air-fuel ratio before the changeover of the combustion modes.

Turning back to FIG. 5, the combustion-mode-changeover-oriented fuel injection quantity control means 28 arithmetically determines the fuel injection quantity Qf at or around the time point of the mode changeover on the basis of the cylinder-charged intake air quantity Qai and the desired air-fuel ratio A/Fo (step S3 in FIG. 5).

Further, the desired intake-air quantity control means 25 and the throttle valve control means 26 cooperate to set the desired throttle valve opening degree θo to be validated after the mode changeover (step S4).

On the other hand, the actual change control of the fuel injection termination timing (off-timing of the injection pulse signal J) and the ignition timing (off-timing of the ignition timing pulse signal G) upon combustion mode changeover are executed simultaneously at the time point when the desired air-fuel ratio A/Fo has exceeded the predetermined air-fuel ratio KA after switching of the combustion mode flag, as can be seen in FIG. 4.

To this end, in a step S5 shown in FIG. 5, decision is made as to whether or not the desired air-fuel ratio A/Fo has exceeded the predetermined air-fuel ratio KA. When it is found that A/Fo>KA (i.e., when the decision step S5 results in affirmation "YES"), the fuel injection termination timing and the ignition timing to be validated after the mode changeover are set in a step S6. On the contrary, when it is decided that A/Fo≦KA (i.e., when the decision step S5 results in negation "NO"), the injection termination timing and the ignition timing validated before the mode changeover are set or maintained (step S7).

Subsequently, in a step S8, the ECU 20A controls the various actuators by using as the control parameters the injection termination timing, the fuel injection quantity and the ignition timing set in the step S6 or step S7.

Incidentally, the predetermined air-fuel ratio KA serving as the reference for deciding the timing for changing over the fuel injection termination timing corresponds to the predetermined value KF shown in FIG. 3. The information concerning the predetermined air-fuel ratio KA may previously be stored in the RAM incorporated in the ECU.

Finally, in a step S9 shown in FIG. 5, decision is made as to whether or not an air-fuel ratio deviation ΔF (=|A/F−A/Fo|) between the air-fuel ratio detection signal F (actual intra-cylinder air-fuel ratio A/F) determined on the basis of the output of the air-fuel ratio sensor 6 and the desired air-fuel ratio A/Fo has converged sufficiently equal to or smaller than a predetermined value δ. When this decision results in negation "NO" (i.e., ΔF>δ), the step S1 is resumed, whereon the processing routine described above is executed repetitively.

On the contrary, when the air-fuel ratio deviation ΔF has converged sufficiently to the predetermined value δ with the decision step S9 resulting in affirmation "YES" (i.e., $\Delta F \leq \delta$), then the intra-cylinder air-fuel ratio A/F can be regarded to coincide substantially with the desired air-fuel ratio A/Fo. Then, execution of the processing routine illustrated in FIG. 5 comes to an end, and thus the combustion mode changeover control is terminated.

As will be appreciated from the foregoing, by modifying or changing the fuel injection quantity Qf in reverse phase relative to the change of the boost pressure Pb indicative of the cylinder-charged intake air quantity Qai upon changeover of the combustion modes, the overall torque change $\Delta Tr$ can be made substantially to zero (see FIG. 2, curve E). In other words, occurrence of the torque shock can be suppressed satisfactorily with the enhanced drivability being ensured.

Embodiment 2

In the case of the fuel injection control system for the cylinder injection type engine according to the first embodiment of the invention, the profile (air-fuel ratio changeover pattern) for changing the desired air-fuel ratio A/Fo with the first-delay being taken into account is stored in the pattern storage means of the combustion-mode-changeover-oriented fuel injection quantity control means 28. However, the desired air-fuel ratio A/Fo may be changed by resorting to a first-order delay determination arithmetic (filter arithmetic) by using a filter correction gain $\beta$.

A second embodiment of the present invention is directed to a fuel injection control system for the cylinder injection engine in which the desired air-fuel ratio A/Fo is changed by executing the first-order delay determination arithmetic processing.

Figure 6:
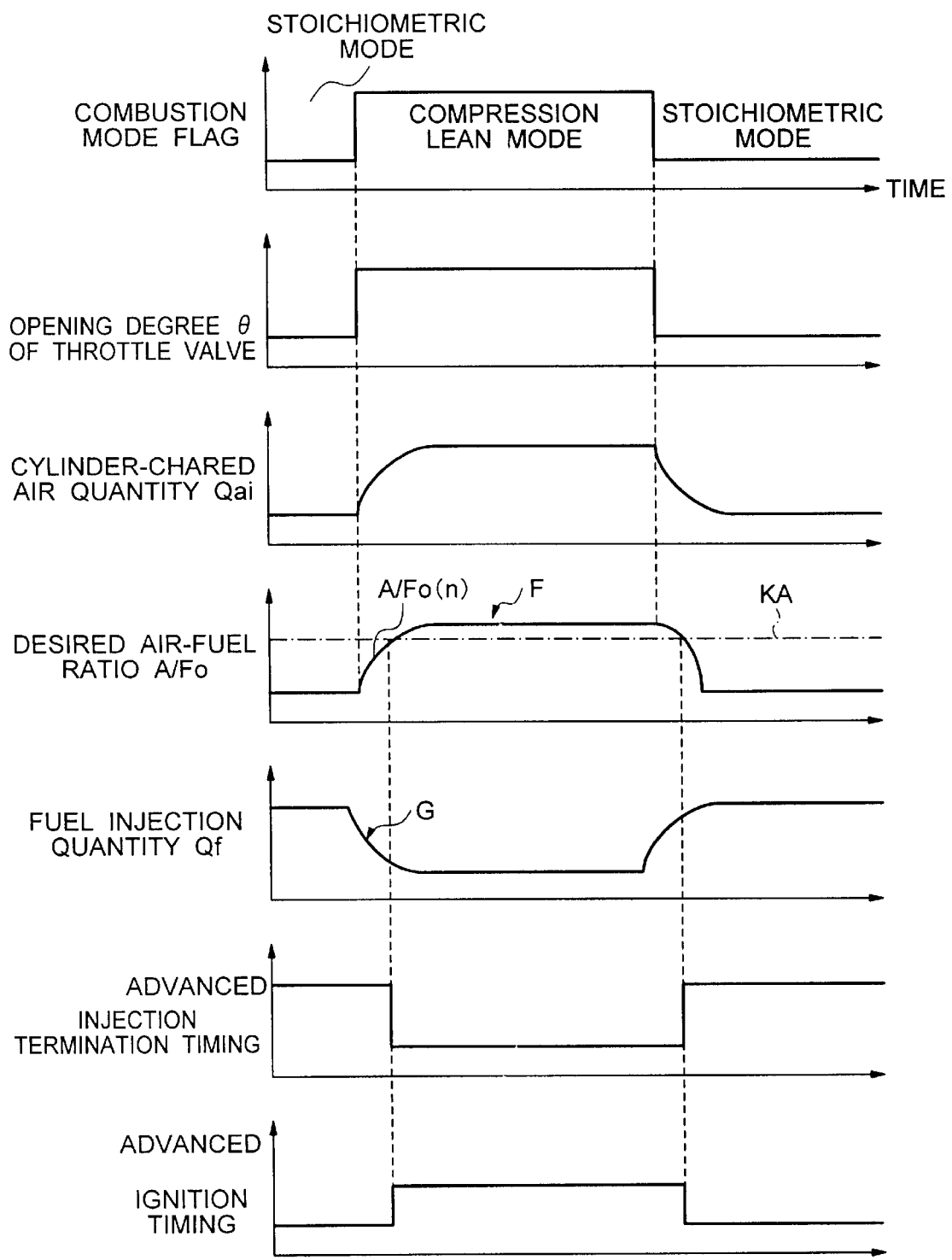
FIG. 6 is a waveform/timing diagram for illustrating a fuel injection quantity altering or modifying operation carried out by the fuel injection control system according to a second embodiment of the invention.
Figure 7:
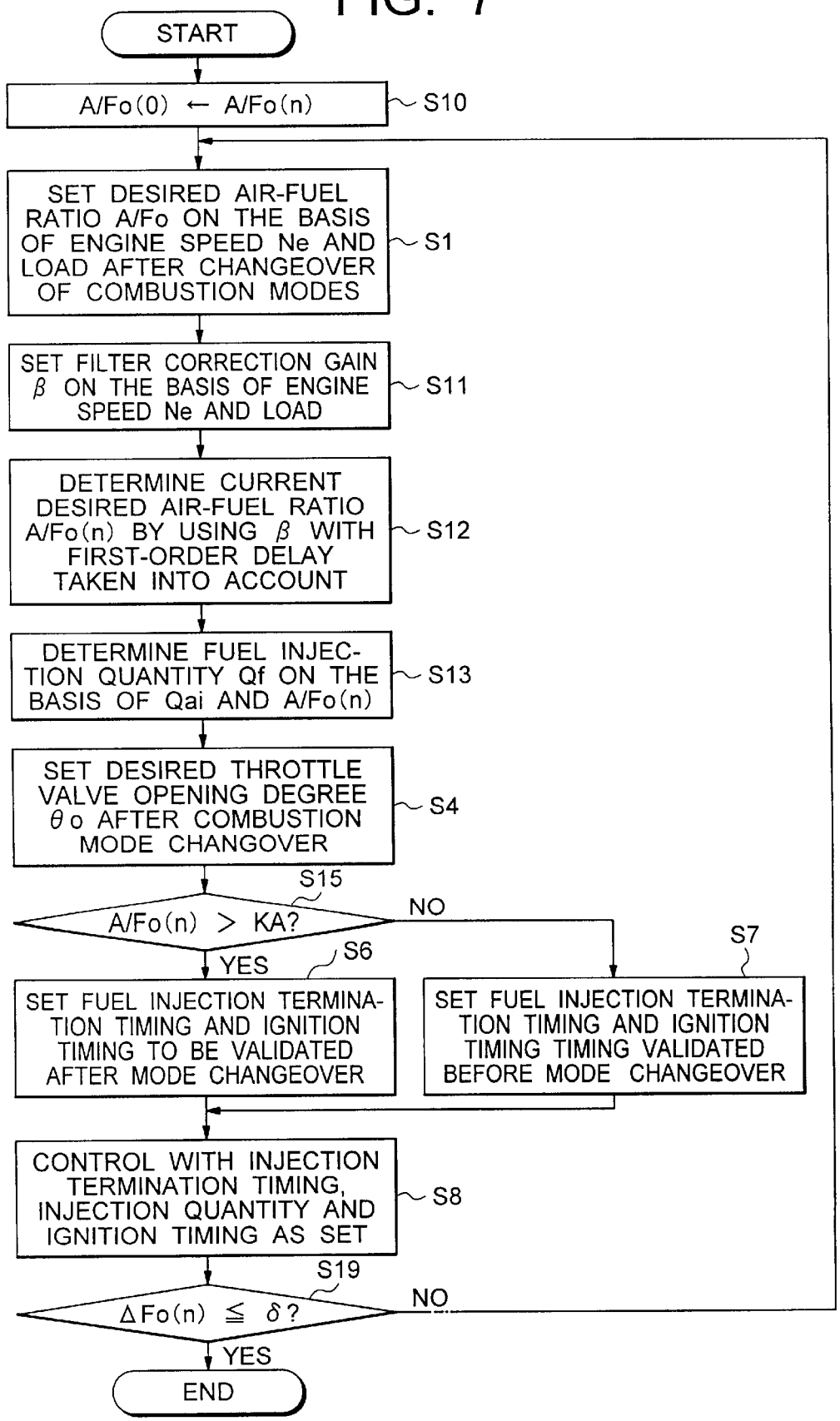
FIG. 7 is a flow chart for illustrating the fuel injection quantity altering or modifying operation of the control system according to the second embodiment of the invention.

Now, the fuel injection control system according to the second embodiment of the invention will be described by referring to FIGS. 6 and 7 in which FIG. 6 is a timing/waveform diagram similar to FIG. 4 and FIG. 7 is a flow chart similar to FIG. 5 for illustrating operation of the fuel injection control system according to the instant embodiment.

In the system now under consideration, the combustion-mode-changeover-oriented fuel injection quantity control means 28 is comprised of a combustion-mode-changeover-oriented air-fuel ratio altering means (not shown) which is designed to set the air-fuel ratio by changing the desired air-fuel ratio at a time point of or around the changeover of the combustion modes M with the first-order delay being taken into account for the suction cycle of the engine 1, wherein upon changeover of the combustion modes M, the fuel injection quantity Qf is changed or altered on the basis of the cylinder-charged intake air quantity information Qai and the updated air-fuel ratio validated for the changed-over mode.

Thus, the fuel injection quantity Qf which changes in following the change of the desired air-fuel ratio A/Fo(n) determined by taking into account the first-order delay (see curve F in FIG. 6) is so altered as to change along the first-order delay curve G in reverse phase relative to the change of the desired air-fuel ratio A/Fo to thereby cancel out positively the first-order delay which accompanies the change of the cylinder-charged intake air quantity Qai, as illustrated in FIG. 6.

Parenthetically, the filter correction gain $\beta$ ($0<\beta<1$) for arithmetic determination of the first-order delay may previously be stored in a RAM (Random Access Memory) incorporated in the ECU 20A as value data which depend on the engine speed Ne (rpm) and the engine load.

Referring to FIG. 7, steps S1, S4, S6 to S8 shown in this figure are similar to those described hereinbefore by reference to FIG. 5. Further, steps S13, S15 and S19 shown in FIG. 7 correspond to the steps S3, S5 and S9 mentioned previously, respectively.

At first, the mode-changeover-oriented air-fuel ratio altering means incorporated in the desired intake-air quantity control means 28 sets an initial value A/Fo(0) of the desired air-fuel ratio A/Fo for the first-order delay determination arithmetic such that the initial value coincides with the currently validated air-fuel ratio value A/Fo(n) (step S10 in FIG. 7).

On the other hand, the desired air-fuel ratio control means 24 sets the desired air-fuel ratio A/Fo on the basis of the engine speed Ne (rpm) and the engine load (step S11).

Further, the mode-changeover-oriented air-fuel ratio altering means incorporated in the combustion-mode-changeover-oriented fuel injection quantity control means 28 sets the filter correction gain $\beta$ for the first-order delay determination arithmetic on the basis of the engine speed Ne and the engine load (step S11).

The filter correction gain $\beta$ is used for executing the first-order delay determination processing for the desired air-fuel ratio A/Fo, as described below.

Namely, the mode-changeover-oriented air-fuel ratio altering means is designed to determine arithmetically a desired air-fuel ratio A/Fo(n) for changing the fuel injection quantity Qf with the first-order delay in reverse phase relative to the change of the cylinder-charged intake air quantity Qai by using the filter correction gain $\beta$ (step S12). The desired air-fuel ratio A/Fo(n) mentioned above is given by the following expression (3).

$$A/Fo(n) = \beta \cdot A/Fo(n-1) + (1-\beta) \cdot A/Fo \qquad (3)$$

where A/Fo(n) represents the desired air-fuel ratio value determined currently with the first-order delay being taken into account, and A/Fo(n−1) represents the desired air-fuel ratio determined precedently with the first-order delay being taken into account.

In succession, the combustion-mode-changeover-oriented fuel injection quantity control means 28 arithmetically determines the fuel injection quantity Qf on the basis of the cylinder-charged intake air quantity Qai and the desired air-fuel ratio A/Fo(n) determined currently with first-order delay taken into account (step S13 in FIG. 7).

Further, the desired intake-air quantity control means 25 and the throttle valve control means 26 cooperate to set the desired throttle valve opening degree $\theta o$ to be validated in succession to the combustion mode changeover (step S4).

Subsequently, decision is made in a step S15 as to whether or not the desired air-fuel ratio A/Fo(n) has exceeded the predetermined air-fuel ratio value KA. When it is decided that A/Fo(n)>KA (i.e., when the decision step S15 results in affirmation "YES"), the fuel injection termination timing and the ignition timing to be validated after the combustion mode changeover are set in a step S6. On the contrary, when it is decided that A/Fo(n)≦KA (i.e., when the decision step S15 results in negation "NO"), the fuel injection termination timing and the ignition timing validated before the combustion mode changeover are set or maintained intactly in a step S7 in FIG. 7.

In succession, the ECU 20A controls the various actuators by using as the control parameters the fuel injection termination timing, the fuel injection quantity and the ignition timing set in the step S6 or step S7 (step S8).

Finally, in a step S19 shown in FIG. 7, decision is made as to whether or not the air-fuel ratio deviation $\Delta Fo(n)$ (=|A/F−A/Fo(n)|) between the actual intra-cylinder air-fuel ratio A/F and the desired air-fuel ratio A/Fo(n) is equal to or smaller than a predetermined value δ.

When this decision results in negation "NO" (i.e., when ΔFo(n)>δ), the step S1 is resumed. On the other hand, when the decision step S19 results in affirmation "YES" (i.e., when δFo(n)≦δ), then the intra-cylinder air-fuel ratio A/F can be regarded so as to be substantially coincident with the desired air-fuel ratio A/Fo. Then, the combustion mode changeover control illustrated in FIG. 7 comes to an end.

As will be appreciated from the above, the fuel injection quantity Qf can be so modified or altered that it changes in reverse phase relative to the change of the boost pressure Pb (indicative of the cylinder-charged intake air quantity Qai) by determining the desired air-fuel ratio A/Fo(n) with the first-order delay being taken into account by using the filter correction gain β upon changeover of the combustion modes.

Thus, the overall torque change ΔTr can be rendered substantially to zero (see FIG. 6). In other words, occurrence of the so-called torque shock can be suppressed and thus the enhanced drivability can be ensured.

Embodiment 3

In the case of the fuel injection control system for the cylinder injection type internal combustion engine according to the second embodiment of the invention, the desired air-fuel ratio A/Fo is arithmetically determined with the first-order delay being taken into consideration upon changeover of the combustion modes. However, change of the cylinder-charged intake air quantity Qai can equally be canceled out by determining arithmetically the desired fuel injection quantity Qfo on the basis of the intake air quantity information Qa obtained at an upstream location within the intake pipe and the desired air-fuel ratio A/Fo while taking into account the first-order delay.

A third embodiment of the present invention is directed to determination of the desired fuel injection quantity Qfo by taking into account the first-order delay upon changeover of the combustion modes.

Figure 8:
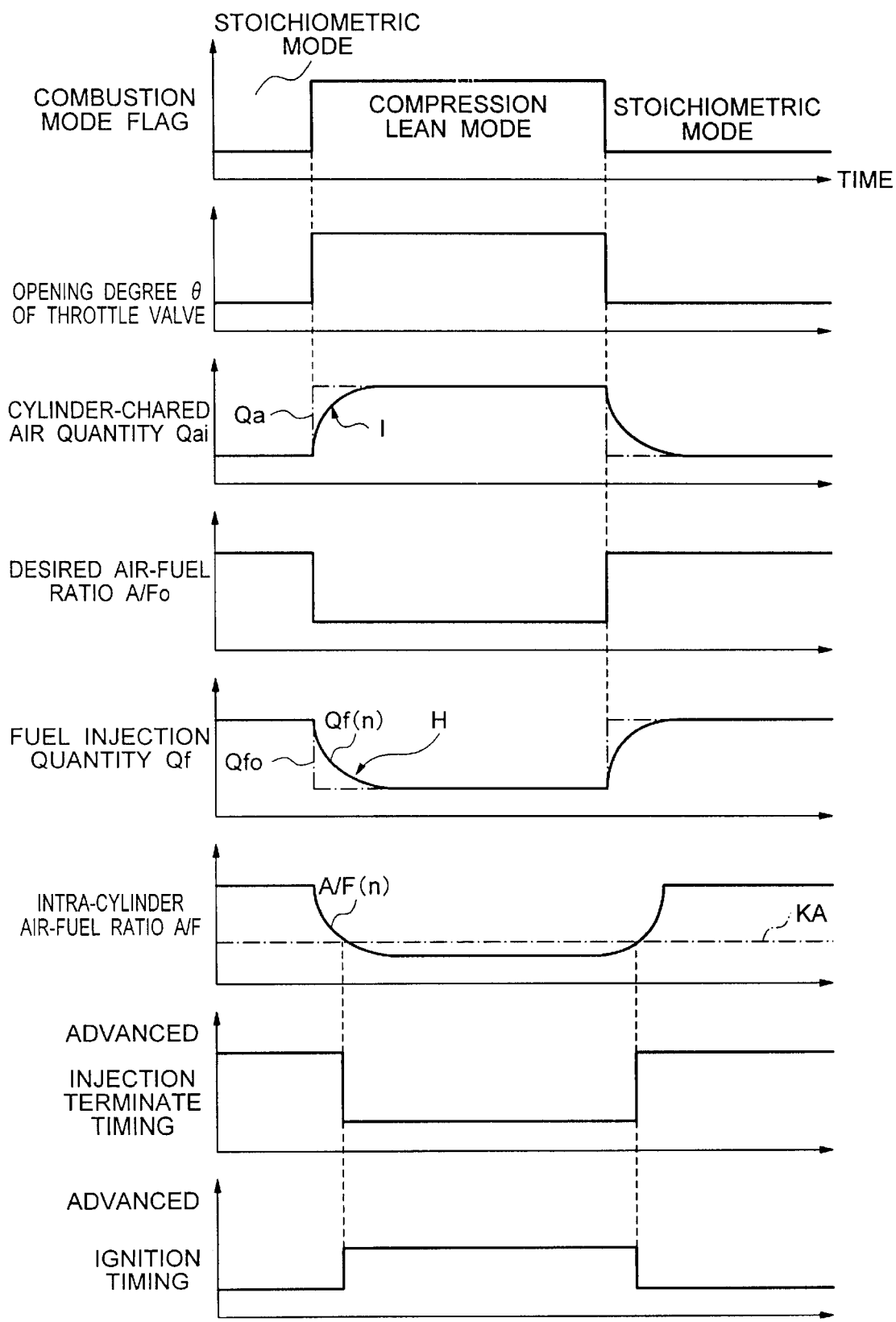
FIG. 8 is a waveform/timing diagram for illustrating a fuel injection quantity altering operation carried out by the fuel injection control system according to a third embodiment of the invention.
Figure 9:
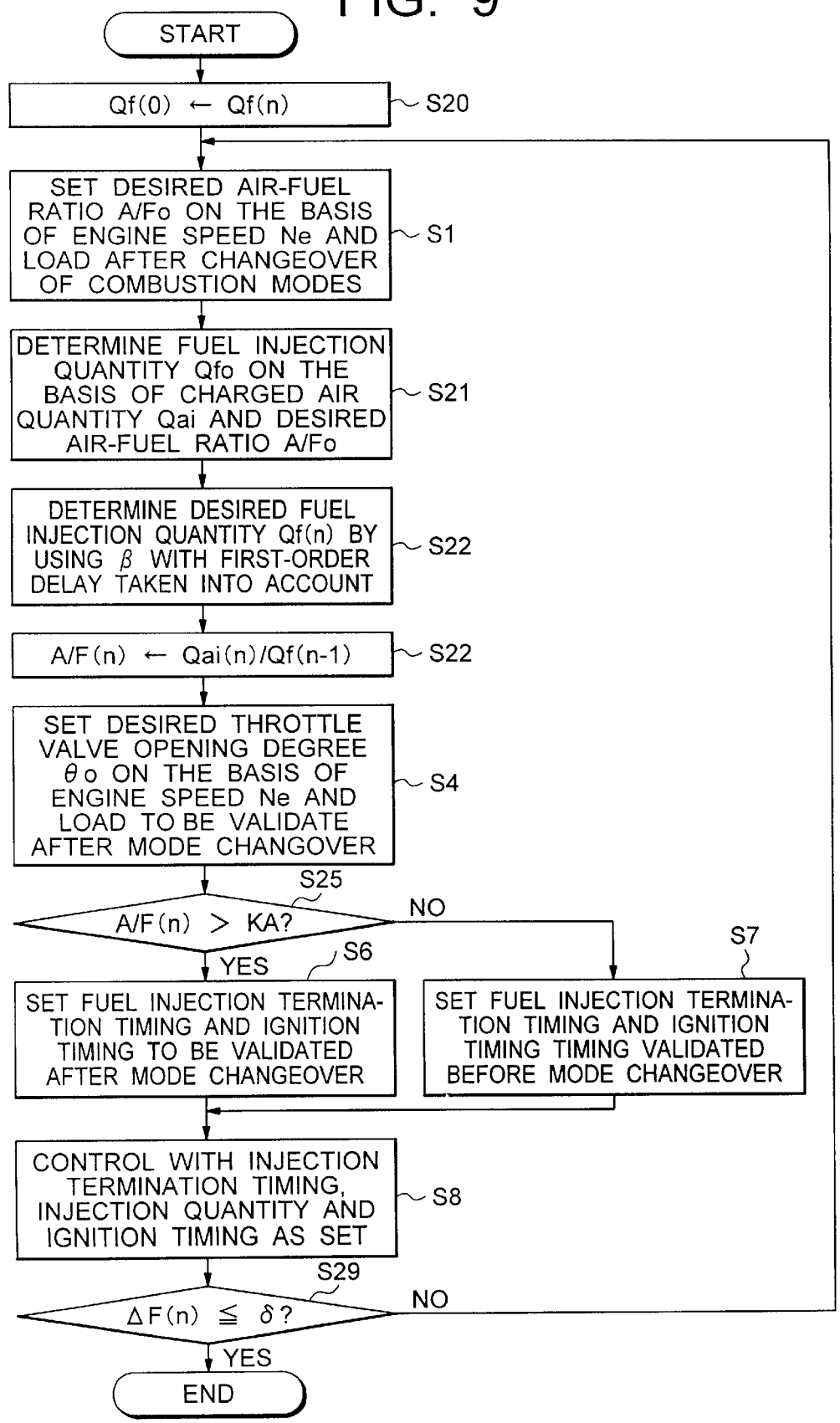
FIG. 9 is a flow chart for illustrating the fuel injection quantity altering operation of the control system according to the third embodiment of the invention.

The fuel injection control system according to the third embodiment of the invention will be described by referring to FIGS. 8 and 9, in which FIG. 8 is a waveform/timing diagram and FIG. 9 is a flow chart for illustrating operation of the fuel injection control system now under consideration. Incidentally, the processing routine shown in FIG. 9 is executed at every suction cycle of the engine 1.

In the fuel injection control system according to the third embodiment of the invention, the sensors 18 include an intake air quantity detecting means, i.e., the air flow sensor 2 (see FIG. 12), which is designed to detect as the intake air quantity information Qa the intake air flow rate at an upstream location within the intake pipe 1a of the engine 1.

Thus, the cylinder-charged intake air quantity Qai corresponding to the boost pressure Pb can be determined by performing the so-called first-order delay filter arithmetic on the intake air quantity Qa obtained at the upstream location within the intake pipe with the cylinder-charged intake air quantity detecting means 21.

On the other hand, the combustion-mode-changeover-oriented fuel injection quantity control means 28 is comprised of a desired fuel injection quantity arithmetic means for determining arithmetically a desired fuel injection quantity Qfo on the basis of the intake air quantity Qa detected at the upstream location within the intake pipe and the desired air-fuel ratio A/Fo, wherein the desired fuel injection quantity arithmetic means is designed to alter or modify the desired fuel injection quantity Qfo by executing the first-order delay filter processing at the suction cycle of the engine 1.

Through the procedure described above, the fuel injection quantity Qf(n) determined with the first-order delay taken into account is so modified as to change accurately in reverse phase relative to the change of the cylinder-charged intake air quantity Qai in the transient state during the combustion mode changeover, as can be seen from comparison of curves H and I shown in FIG. 8.

Referring to FIG. 9, steps S1, S4, S6 to S8 shown in this figure are similar to those described hereinbefore by reference to FIG. 7. Further, steps S20, S22, S25 and S29 shown in FIG. 9 correspond to the steps S10, S12, S15 and S19 mentioned previously, respectively.

At first, the combustion-mode-changeover-oriented air-fuel ratio altering means incorporated in the combustion-mode-changeover-oriented fuel injection quantity control means 28 sets an initial value Qf(0) of the fuel injection quantity Qf for the first-order delay determination arithmetic such that the initial value coincides with the currently validated fuel injection quantity Qf(n) (step S20 in FIG. 9). On the other hand, the desired air-fuel ratio control means 24 sets the desired air-fuel ratio A/Fo (step S1).

Further, the desired fuel injection quantity arithmetic means incorporated in the combustion-mode-changeover-oriented fuel injection quantity control means 28 determines arithmetically the desired fuel injection quantity Qfo on the basis of the intake air quantity Qa measured at an upstream location within the intake pipe and the desired air-fuel ratio A/Fo (step S21).

The combustion-mode-changeover-oriented fuel quantity control means 28 determines arithmetically the fuel injection quantity Qf(n) which changes with the first-order delay in reverse phase relative to the change of the cylinder-charged intake air quantity Qai by using the filter correction gain β (step S22). The fuel injection quantity Qf(n) is given by the following expression (4).

$$Qf(n) = \beta \cdot Qf(n-1) + (1-\beta) \cdot Qfo \quad (4)$$

where Qf(n) represents the desired air-fuel ratio determined currently by taking into account the first-order delay, and Qf(n−1) represents the desired air-fuel ratio determined precedently with the first-order delay being taken into account.

In this case, the filter correction gains β employed for arithmetically determining the cylinder-charged intake air quantity Qai from the intake air quantity information Qa can be used intactly as the gain β appearing in the above expression (4).

In succession, the combustion-mode-changeover-oriented fuel injection quantity control means 28 determines arithmetically the current intra-cylinder air-fuel ratio A/F(n) on the basis of the current cylinder-charged intake air quantity Qai(n) and the preceding fuel injection quantity Qf(n−1) in accordance with the undermentioned expression (5) (step S23).

$$A/F(n) = Qai(n)/Qf(n-1) \quad (5)$$

By determining arithmetically the current intra-cylinder air-fuel ratio A/F(n) on the basis of the cylinder-charged intake air quantity Qai(n) and the fuel injection quantity Qf(n−1) in accordance with the expression (5), the fuel injection termination timing and the ignition timing can simultaneously be changed over at a time point when the intra-cylinder air-fuel ratio A/F(n) exceeds the predetermined air-fuel ratio KA (step S25).

Subsequently, the desired intake-air quantity control means 25 and the throttle valve control means 26 cooperate to set the desired throttle valve opening degree θo to be validated after the combustion mode changeover (step S4), whereon decision is made by the combustion-mode-changeover-oriented fuel injection quantity control means 28 as to whether or not the intra-cylinder air-fuel ratio A/F(n) has exceeded the predetermined air-fuel ratio KA (step S25).

When it is found in the step S25 that A/F(n)>KA (i.e., when the decision step S25 results in affirmation "YES"), the fuel injection termination timing and the ignition timing to be validated after the combustion mode changeover operation are set (step S6). On the contrary, when it is decided that A/F(n)≦KA (i.e., when the decision step S25 results in negation "NO"), the fuel injection termination timing and the ignition timing validated before the mode changeover operation are set or maintained as they are (step S7).

In succession, in a step S8, the ECU 20A carries out controls for the various actuators by using as the control parameters the fuel injection termination timing, the fuel injection quantity and the ignition timing set in the step S6 or step S7.

Finally, in a step S29 shown in FIG. 9, decision is made as to whether or not the air-fuel ratio deviation ΔF(n) (=|A/F(n)−A/Fo|) between the intra-cylinder air-fuel ratio A/F(n) and the desired air-fuel ratio A/Fo is equal to or smaller than a predetermined value δ.

When this decision results in "NO" (i.e., when ΔF(n)>δ), the step S1 is resumed. On the other hand, when the decision step S29 results in "YES" (i.e., when ΔF(n)≦δ), it can then be regarded that the intra-cylinder air-fuel ratio A/F(n) coincides substantially with the desired air-fuel ratio A/Fo. Then, the combustion mode changeover control illustrated in FIG. 9 is terminated.

As will be appreciated from the foregoing, the fuel injection quantity Qf can be altered so as to change in reverse phase relative to the change of the boost pressure Pb (cylinder-charged intake air quantity Qai) by determining as the desired fuel injection quantity Qfo the fuel injection quantity Qf(n) for which the first-order delay is taken into account.

In this way, the overall torque change ΔTr can be rendered substantially to zero (see FIG. 6). In other words, occurrence of the so-called torque shock can be suppressed satisfactorily and thus enhanced drivability can be ensured.

The processing (step S22) for determining the fuel injection quantity Qf(n) from the desired fuel injection quantity Qfo by taking into account the first-order delay is same as the arithmetic processing for determining the boost pressure Pb (indicative of the cylinder-charged intake air quantity Qai). In other words, same value as that of the filter correction gain β employed for determining the boost pressure Pb can be used in the processing for determining the fuel injection quantity mentioned above. By virtue of this feature, matching processing of variable quantities involved in the combustion mode changeover control can be much facilitated.

Embodiment 4

In the case of the fuel injection control system according to the first embodiment of the invention, no consideration has been paid to reduction or lowering of the output torque of the engine 1 in a region covering or close to the predetermined value KF shown in FIG. 3 upon changeover of the combustion modes. In this conjunction, the fuel injection quantity Qf around the time point of the combustion mode changeover may be supplementarily increased.

A fourth embodiment of the present invention is directed to the fuel injection control system which is so arranged as to increase correctively or supplementarily the fuel injection quantity Qf upon changeover of the combustion modes in a region including the predetermined air-fuel ratio KA.

The fuel injection control system according to the instant embodiment will be described by referring to FIGS. 10 and 11 which show a waveform timing diagram and a flow chart for illustrating operations of the fuel injection control system according to the fourth embodiment of the invention.

In the fuel injection control system now under consideration, the combustion-mode-changeover-oriented fuel injection quantity control means 28 is so arranged that the fuel injection quantity Qf is correctively or supplementarily increased upon changeover of the combustion modes in a region covering the predetermined air-fuel ratio KA in which the combustion state or performance of the engine 1 is degraded or lowered more or less.

According to the teachings of the present invention incarnated in the instant embodiment, the desired air-fuel ratio A/Fo is lowered (i.e., the air-fuel mixture is enriched) in the region in which the combustion performance of the engine 1 lowers (i.e., the region around the predetermined operation point such as the combustion mode changeover time) in order to increase supplementarily the fuel injection quantity Qf. By virtue of this arrangement, it is possible to protect the output torque from lowering in the combustion-poor region of the engine 1.

Figure 10:
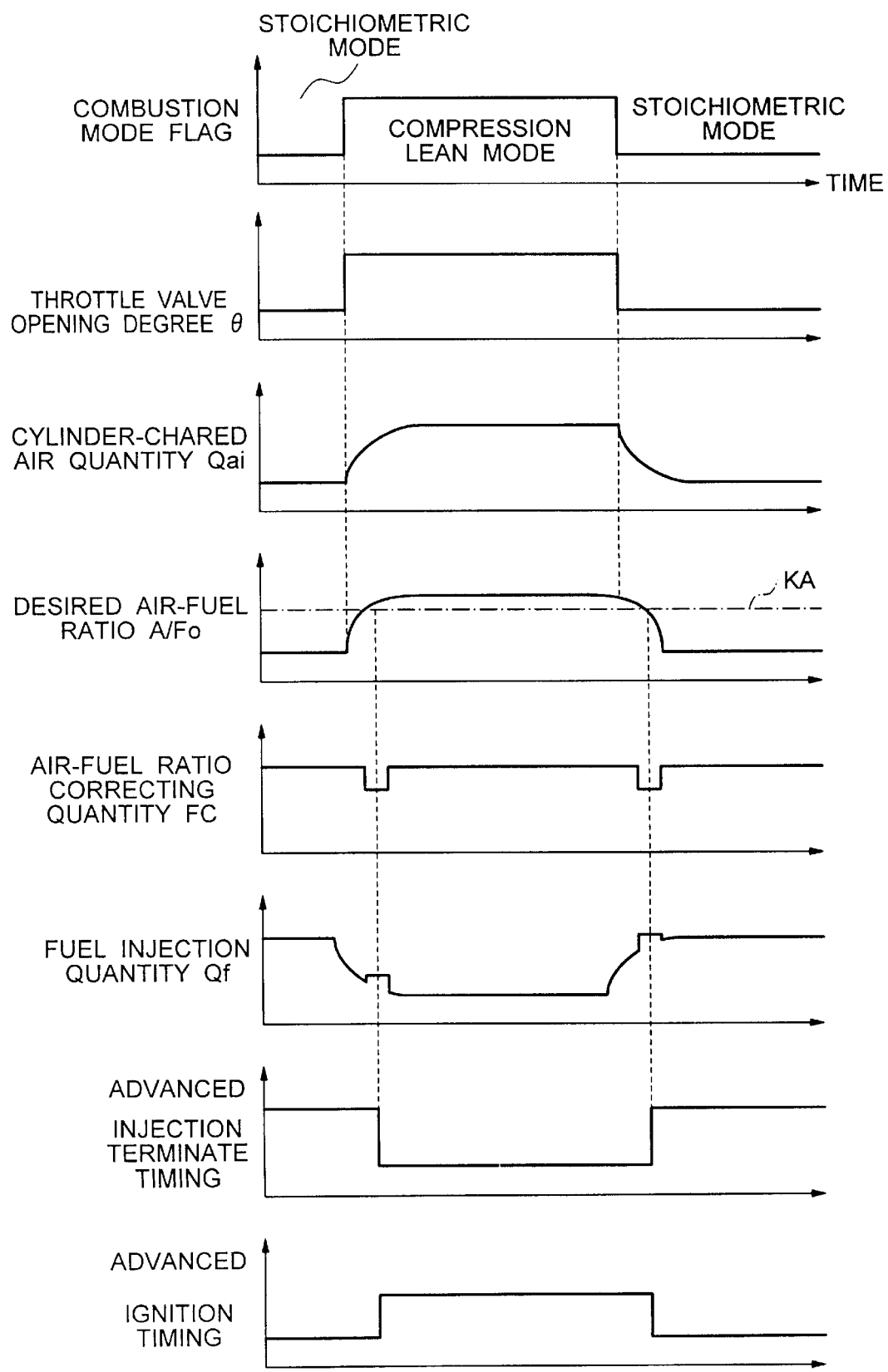
FIG. 10 is a waveform/timing diagram for illustrating a supplementary fuel injecting operation carried out by the fuel injection control system according to a fourth embodiment of the invention.

As can be seen in FIG. 10, the desired air-fuel ratio A/Fo is decreased by a air-fuel ratio correcting quantity FC in the region close to the predetermined air-fuel ratio KA. In other words, the fuel injection quantity Qf is correspondingly increased supplementarily.

Figure 11:
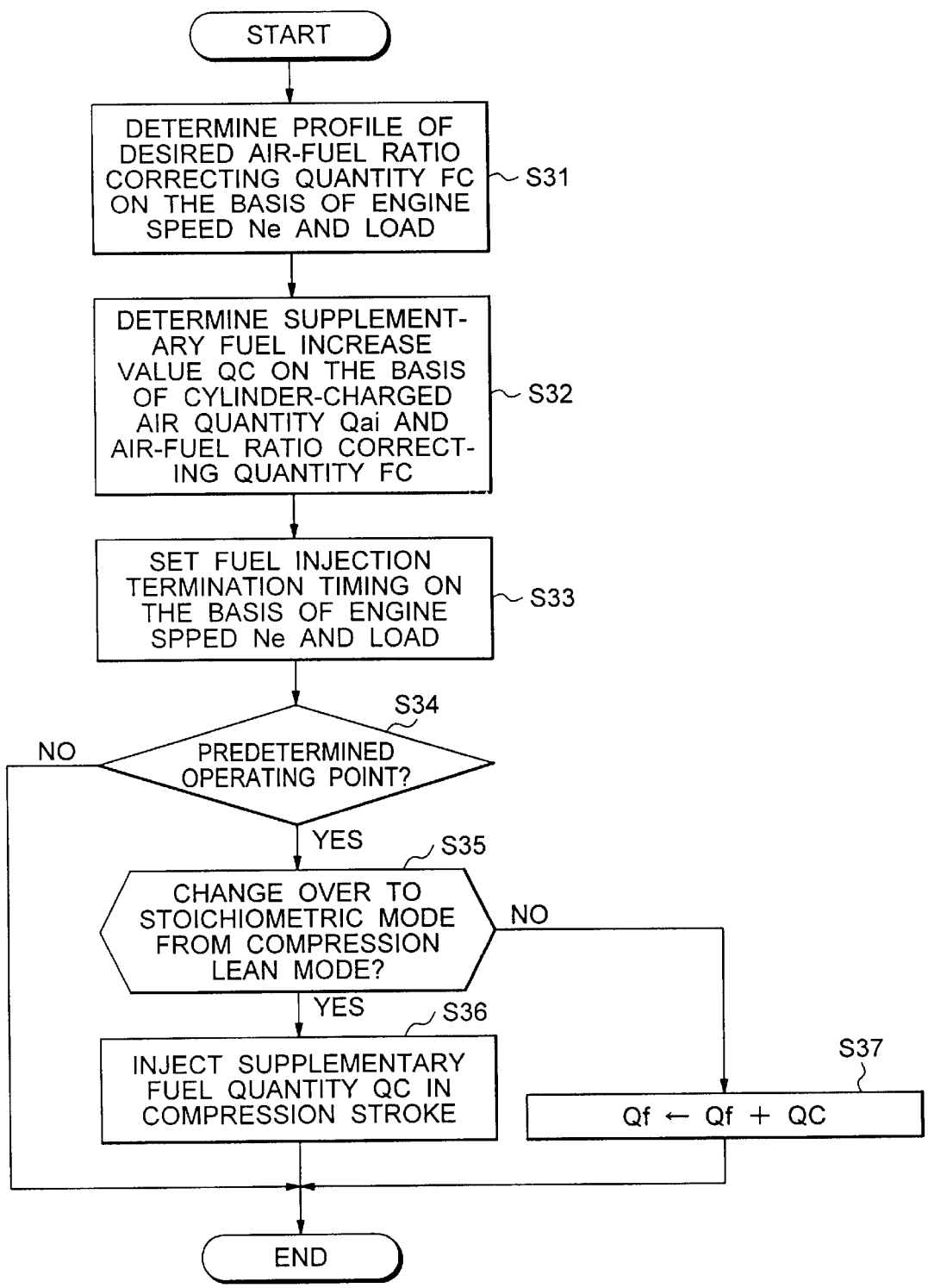
FIG. 11 is a flow chart for illustrating the supplementary fuel injecting operation of the control system according to the fourth embodiment of the invention.

Now referring to FIG. 11, the combustion-mode-changeover-oriented fuel injection quantity control means 28 determines a profile of the air-fuel ratio correcting quantity FC on the basis of the engine speed Ne and the load (step S31), whereon the supplementary fuel increase value QC of the fuel injection quantity Qf is arithmetically determined on the basis of the cylinder-charged intake air quantity Qai and the air-fuel ratio correcting quantity FC in a step S32.

In a step S33, the fuel injection termination timing is set on the basis of the engine speed Ne and the load, which is then followed by a step S34 where decision is made as to the predetermined operating point is detected.

When the decision step S32 results in negation "NO" indicating that the predetermined operating point is not detected, the increased quantity correction program routine comes to an end without executing the supplementary fuel quantity injection processing.

On the other hand, when the predetermined operating point is detected in the step S34 (i.e., when the decision step S34 results in affirmation "YES") for the combustion mode changeover operation with the air-fuel ratio A/F falling within the range covering the predetermined air-fuel ratio KA, then it is decided whether or not the compression lean mode is to be changed over to the stoichiometric mode (or suction lean mode) in a step S35.

When it is decided in the step S35 that the compression lean mode is to changed over to the stoichiometric mode (i.e., when the decision step S35 results in affirmation "YES"), an additional fuel injection corresponding to the supplementary fuel increase value QC is effectuated in the compression stroke (step S36), whereupon the supplementary fuel increase routine illustrated in FIG. 11 comes to an end.

In general, in the compression lean mode, the EGR regulating valve 17 (see FIG. 12) is opened with the EGR quantity being increased. Consequently, even when the EGR regulating valve 17 is closed immediately after the mode changeover to the stoichiometric mode, EGR remains effective.

For the reason mentioned above, it is impossible to lower the air-fuel ratio A/F (i.e., to enrich the cylinder-charged air-fuel mixture) with the ordinary fuel injection quantity Qf, incurring degradation of the combustion performance of the engine 1.

For coping with the problem mentioned above, the amount of fuel corresponding to the supplementary fuel increase value QC is additionally injected during the compression stroke for realizing the fuel increasing correction at the predetermined operating point at which the combustion performance becomes poor due to the fuel injection in the suction stroke in the step S36.

At this juncture, it should be mentioned that the supplementary fuel injection (step S36) is carried out only during the period in which the combustion performance is lowered for the mode changeover to the suction stroke fuel injection. Ordinarily, such supplementary or corrective fuel injection may be carried out over several cycles immediately succeeding to the changeover to the combustion mode.

On the other hand, when it is decided in the step S35 that the mode changeover to the stoichiometric combustion mode from the compression lean mode is not effectuated (i.e., when the decision step S35 results in negation "NO"), then the currently effective combustion mode is regarded as the compression stroke injection mode, whereon the fuel injection quantity Qf is supplementarily increased by an amount corresponding to the supplementary fuel increase value QC (step S37), whereon the increased quantity correction routine illustrated in FIG. 11 comes to an end.

As is apparent from the above description, by increasing correctively or supplementarily the fuel injection quantity Qf in the transient state involved upon mode changeover to the combustion mode M (for changing the desired air-fuel ratio A/Fo) in the region covering the predetermined air-fuel ratio KA at which the output torque of the engine becomes low due to degradation of the combustion performance, it is possible to protect the engine output torque from lowering, which can thus ensure improved drivability.

Furthermore, because the combustion-mode-changeover-oriented fuel injection quantity control means 28 is so arranged as to perform the additional or supplementary fuel injection during the compression stroke of the engine 1 when the combustion state of the engine 1 becomes degraded upon changeover of the combustion modes from the compression lean (stratified combustion) mode to the stoichiometric (homogeneous combustion) mode, the output torque of the engine can be protected against lowering and thus the drivability can be enhanced.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the fuel injection control system according to the fourth embodiment of the invention, the supplementary or corrective fuel injection is carried out during the compression stroke upon changeover to the stoichiometric mode from the compression lean mode. However, such supplementary fuel injection may be performed during the suction stroke, substantially to the same advantageous effect.

Accordingly, all suitable modifications and equivalents may be resorted to, falling within the spirit and scope of the invention.

What is claimed is:

1. A fuel injection control system for a cylinder injection type internal combustion engine, comprising:

various types of sensor means for detecting operation states of an internal combustion engine;

fuel injector means for injecting fuel directly into a cylinder of said engine;

cylinder-charged intake air quantity detecting means for detecting cylinder-charged intake air quantity information corresponding to an intake air quantity charged in the cylinder of said engine on the basis of intake air quantity information derived from outputs of said sensor means;

combustion mode control means for setting one of combustion modes of said engine in dependence on said operation states thereof;

desired air-fuel ratio control means for setting one of desired air-fuel ratios which differ in dependence on said combustion modes;

desired intake-air quantity control means for setting one of desired intake air quantities which differ in dependence on said combustion modes;

fuel injection quantity control means for setting a fuel injection quantity for said fuel injector means so that said one desired air-fuel ratio is realized;

throttle valve control means for setting a throttle valve opening degree of said engine so that said one desired intake air quantity is realized; and combustion mode changeover means for changing over said combustion modes in dependence on said operation states, wherein said fuel injection quantity control means includes:

combustion-mode-changeover-oriented fuel injection quantity control means for modifying said fuel injection quantity so that change thereof assumes reverse phase relative to a change of said cylinder-charged intake air quantity information upon changeover of said combustion modes.

2. A fuel injection control system for a cylinder injection type internal combustion engine according to claim 1, said combustion-mode-changeover-oriented fuel injection quantity control means including:

air-fuel ratio changeover pattern storage means for storing previously a changeover pattern of said desired air-fuel ratio as an air-fuel ratio changeover pattern so that said fuel injection quantity changes in reverse phase relative to the change of said cylinder-charged intake air quantity information, wherein said desired air-fuel ratio upon changeover of said combustion modes is altered on the basis of the desired air-fuel ratio at a time point around the changeover of said combustion modes and said air-fuel ratio changeover pattern, and wherein said fuel injection quantity is altered at the time point of changeover of said combustion modes on the basis of said altered desired air-fuel ratio and said cylinder-charged intake air quantity information.

3. A fuel injection control system for a cylinder injection type internal combustion engine according to claim 1, said combustion-mode-changeover-oriented fuel injection quantity control means including:

combustion-mode-changeover-oriented air-fuel ratio altering means for setting a combustion-mode-changeover-oriented air-fuel ratio by changing with a first-order delay the desired air-fuel ratio for suction cycle of said engine at a time point around the changeover of said combustion modes, wherein said fuel injection quantity upon changeover of said combustion modes is altered on the basis of said cylinder-charged intake air quantity information and said combustion-mode-changeover-oriented air-fuel ratio.

4. A fuel injection control system for a cylinder injection type internal combustion engine according to claim 1, said various type sensor means including:
intake air quantity detecting means for detecting as intake air quantity information an intake air quantity at an upstream location within an intake pipe of said engine, and said combustion-mode-changeover-oriented fuel injection quantity control means including:
desired fuel injection quantity arithmetic means for determining arithmetically a desired fuel injection quantity on the basis of said intake air quantity information and said desired air-fuel ratio, wherein said desired fuel injection quantity is changed with a first-order delay for a suction cycle of said engine.

5. A fuel injection control system for a cylinder injection type internal combustion engine according to claim 1, wherein said combustion-mode-changeover-oriented fuel injection quantity control means is designed to increase supplementarily the fuel injection quantity around a time point of changeover of said combustion modes in a region covering a predetermined air-fuel ratio in which combustion performance of said engine becomes degraded.

6. A fuel injection control system for a cylinder injection type internal combustion engine according to claim 1, wherein said combustion modes comprise a homogeneous combustion mode in which the fuel injection is carried out during a suction stroke of said engine and a stratified combustion mode in which the fuel injection is carried out during a compression stroke of said engine, and wherein said combustion-mode-changeover-oriented fuel injection quantity control means is designed to perform supplementary fuel injection during a compression stroke of said engine around a time point of combustion mode changeover from said stratified combustion mode to said homogeneous combustion mode when the combustion performance of said engine becomes degraded.

* * * * *